(12) United States Patent
Endo et al.

(10) Patent No.: US 8,270,061 B2
(45) Date of Patent: Sep. 18, 2012

(54) DISPLAY APPARATUS USING PULSED LIGHT SOURCE

(75) Inventors: Taro Endo, Chofu (JP); Kazuma Arai, Hachioji (JP); Yoshihiro Maeda, Hachioji (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 954 days.

(21) Appl. No.: 12/286,801

(22) Filed: Oct. 1, 2008

(65) Prior Publication Data

US 2009/0135315 A1    May 28, 2009

Related U.S. Application Data

(63) Continuation-in-part of application No. 11/121,543, filed on May 4, 2005, now Pat. No. 7,268,932, which is a continuation-in-part of application No. 10/698,620, filed on Nov. 1, 2003, now abandoned, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 60/997,476, filed on Oct. 2, 2007.

(51) Int. Cl.
    *G02B 26/00* (2006.01)
(52) U.S. Cl. .................................................. 359/290
(58) Field of Classification Search .................. 359/290, 359/291, 295, 242, 298; 353/20
    See application file for complete search history.

(56) References Cited

U.S. PATENT DOCUMENTS

| | | | |
|---|---|---|---|
| 4,229,732 A | 10/1980 | Hartstein et al. | |
| 4,769,713 A | 9/1988 | Yasui | |
| 5,192,946 A | 3/1993 | Thompson et al. | |
| 5,214,420 A | 5/1993 | Thompson et al. | |
| 5,287,096 A | 2/1994 | Thompson et al. | |
| 5,448,314 A | 9/1995 | Heimbuch et al. | |
| 5,589,852 A | 12/1996 | Thompson et al. | |
| 5,617,243 A | 4/1997 | Yamazaki et al. | |
| 5,619,228 A | 4/1997 | Doherty et al. | |
| 5,668,611 A | 9/1997 | Ernstoff et al. | |
| 5,767,828 A | 6/1998 | McKnight | |
| 5,831,588 A * | 11/1998 | Hotto | 345/100 |
| 5,917,558 A | 6/1999 | Stanton | |
| 5,986,640 A | 11/1999 | Baldwin et al. | |
| 6,232,963 B1 | 5/2001 | Tew et al. | |
| 6,476,848 B2 * | 11/2002 | Kowarz et al. | 347/255 |
| 6,975,366 B2 | 12/2005 | Flint | |
| 7,154,458 B2 | 12/2006 | Nakanishi | |
| 7,232,224 B2 | 6/2007 | Penn | |
| 7,869,115 B2 * | 1/2011 | Endo et al. | 359/290 |
| 2006/0285136 A1 | 12/2006 | Shin et al. | |
| 2007/0200806 A1 | 8/2007 | Vestal et al. | |

* cited by examiner

*Primary Examiner* — Ricky Mack
*Assistant Examiner* — Tuyen Tra
(74) *Attorney, Agent, or Firm* — Bo-In Lin

(57) ABSTRACT

The present invention provides a display apparatus, comprising: a light source; at least one spatial light modulator for modulating a luminous flux emitted from the light source; and a controller for processing inputted video image information and for controlling the light source and spatial light modulator, wherein the controller controls the light source and spatial light modulator so that the light source performs pulse emission for a period shorter than a period in which the spatial light modulator is controlled under a modulation state.

34 Claims, 26 Drawing Sheets

Gray scale N bit $\geq$ n
$I_1$ = a first current for $I_{th}$ and LSB
$I_2$ = a first current for LSB+1
$I_3$ = a first current for LSB+2
．
．
$I_n$ = a first current for MSB ・non SW: $P_b = k \times I_b \fallingdotseq 0$ [mW] ($I_b \fallingdotseq I_{th}$)
・$SW_1$: $P_1 = k \times (I_b + I_1)$
・$SW_2$: $P_2 = k \times (I_b + I_1 + I_2)$
．
．
・$SW_n$: $P_n = k \times (I_b + I_1 + I_2 + \cdots + I_{n-1} + I_n)$

DISPLAY APPARATUS USING PULSED LIGHT SOURCE

CROSS REFERENCE TO RELATED APPLICATIONS

This application is a Non-provisional application claiming a Priority date of Oct. 2, 2007 based on a previously filed Provisional Application 60/997,476 and a Non-provisional patent application Ser. No. 11/121,543 filed on May 4, 2005 issued into U.S. Pat. No. 7,268,932. The application Ser. No. 11/121,543 is a Continuation In Part (CIP) Application of three previously filed Applications. These three Applications are Ser. No. 10/698,620 filed on Nov. 1, 2003, Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this Patent Applications. The disclosures made in these Patent Applications are hereby incorporated by reference in this Patent Application.

BACKGROUND OF THE INVENTION

1. Field of the Invention

The present invention relates generally to the system configuration and methods for controlling and operating a projection apparatus. More particularly, this invention related to an image projection apparatus implemented with a plurality of spatial light modulators and light sources with a controller to control the modulators in different modulations states in coordination with the light sources emitting pulsed emissions to achieve optimal quality of image display.

2. Description of the Related Art

After the dominance of CRT technology in the display industry for over 100 years, Flat Panel Display (hereafter FPD) and Projection Display became popular because of its smaller form-factor and larger size of the screen. Among several types of projection displays, projection displays using micro-display are gaining recognition by consumers because of higher picture quality as well as lower cost than FPDs. There are two types of micro-displays used for projection displays in the market: micro-LCD (Liquid Crystal Display) and micro-mirror technology. Because a micro-mirror device uses the randomly polarized light, it is brighter than a micro-LCD, which uses polarized light.

Even though there have been significant advances made in recent years on the technologies of implementing electromechanical micro-mirror devices as spatial light modulator, there are still limitations and difficulties when these are employed to display high quality images. Specifically, when the display images are digitally controlled, the image quality is adversely affected because the image is not displayed with a sufficient number of gray scales.

The on-and-off states of micro-mirror control schemes, as that implemented in the U.S. Pat. No. 5,214,420 and by most of the conventional display systems such as that disclosed in U.S. Pat. No. 5,285,407 impose a limitation on the quality of the display. Specifically, with conventional configurations of the control circuit, the gray scale of conventional systems (PWM between ON and OFF states) is limited by the LSB (least significant bit, or the least pulse width). Due to the On-Off states implemented in the conventional systems, there is no way to provide a shorter pulse width than the LSB. The least brightness, which determines the gray scale, is the light reflected during the least pulse width. A limited gray scale leads to lower image quality.

In a simple example, and assuming n bits of gray scales, the frame time is divided into $2^n-1$ equal time slices. For a 16.7 milliseconds frame period and n-bit intensity values, the time slice is $16.7/(2^n-1)$ milliseconds Having established these times for each pixel of each frame, pixel intensities are quantified, such that black is 0 time slices, the intensity level represented by the LSB is 1 time slice, and the maximum brightness is $2^n-1$ time slices. Each pixel's intensity determines it's the length of time the pixel is turned on during a frame period. Thus, during a frame period, each pixel with a value of more than 0 is on for the number of time slices that correspond to its intensity. The viewer's eye integrates the pixel's brightness so that the image appears the same as if it were generated with analog levels of light.

For addressing deformable mirror devices, PWM receives the data formatted into "bit-planes". Each bit-plane corresponds to a bit weight of the intensity value. Thus, if each pixel's intensity is represented by an n-bit value, each frame of data has n bit-planes. Each bit-plane has a 0 or 1 value for each display element. In the example described above, each bit-plane is separately loaded during a frame, and the display elements are addressed according to their associated bit-plane values. For example, the bit-plane representing the LSBs of each pixel is displayed for 1 time slice.

Projection apparatuses, such as those described above, generally use a light source such as a high-pressure mercury lamp or a xenon lamp. However, these types of light sources perform poorly in high-speed switching that alternate between the ON and OFF states. Because of this, these lamps are commonly controlled to be in a continuous ON state while the apparatus is in operation. Thus, it is not possible to accurately control the light intensity in the transition state, between an ON state and an OFF state, for an ON/OFF modulation of a mirror. This causes a degradation of image quality in the modulation control of a video image when using a spatial light modulator.

Furthermore, when the intensity of light modulated by a spatial light modulator is only controlled by the ON/OFF operation of the mirror, the oscillation speed of the mirror needs to be increased in order to implement a finer control of the light intensity. Increasing the oscillation speed of the mirror, however, is limited by a number of factors including the strength of a hinge constituting the mirror and the frequency of the control signal used for the tilt (i.e., oscillation) control, such as the ON/OFF control. Thus, there will be a limitation in controlling light intensity when only the ON/OFF controls of the mirror are used to control the modulation of light intensities.

In order to control the color temperature and/or color balance, the input video signal needs to be processed. Because of this, further technical problems, such as an unnecessarily complex process circuit for the video, are introduced.

SUMMARY OF THE INVENTION

A purpose of the present invention is to provide a technique capable of attaining an accurate intensity of modulated light without being influenced by the transition state between the ON and OFF states of the ON/OFF modulation of a mirror.

Another purpose of the present invention is to provide a technique capable controlling the intensity of modulated light independent of the speed of the tilt control of a mirror.

Yet another purpose of the present invention is to provide a technique capable of controlling a color temperature and a color balance without requiring an input video signal to be changed.

A first exemplary embodiment of the present invention provides a display apparatus comprising a light source, at least one spatial light modulator for modulating a luminous flux emitted from the light source, and a controller for processing inputted video image information and for controlling the light source and spatial light modulation means, wherein the controller controls the light source and spatial light modulator so that the light source performs pulse emission for a period shorter than a period in which the spatial light modulator is controlled under a modulation state.

A second exemplary embodiment of the present invention provides the display apparatus according to the first exemplary embodiment, wherein the period in which the spatial light modulator is controlled under a modulation state is a minimum unit of time in which the spatial light modulator is controlled under a modulation state, on the basis of the video image information.

A third exemplary embodiment of the present invention provides the display apparatus according to the second exemplary embodiment, wherein the minimum unit of time is a period of time in accordance with a period of time for loading, onto the pixel of the spatial light modulator, a minimum unit of data to control the gradation of the brightness of the spatial light modulator on the basis of the video image information.

A fourth exemplary embodiment of the present invention provides the display apparatus according to the first exemplary embodiment; wherein the light source is a light emitting diode (LED) or laser light source.

A fifth exemplary embodiment of the present invention provides the display apparatus according to the first exemplary embodiment, wherein the spatial light modulator is controlled under a plurality of modulation states in accordance with a control signal from the controller.

A sixth exemplary embodiment of the present invention provides the display apparatus according to the first exemplary embodiment, further comprising a projector, wherein the spatial light modulator is a mirror device comprising a plurality of micromirrors, and the projector projects the modulation light of the spatial light modulator.

A seventh exemplary embodiment of the present invention provides the display apparatus according to the sixth exemplary embodiment, wherein the spatial light modulator is controlled under in an ON state for guiding the luminous flux emitted from the light source to the projector, an OFF state for guiding the luminous flux emitted from the light source away from the projector, and an oscillation state that is between the ON state and OFF state.

An eighth exemplary embodiment of the present invention provides the display apparatus according to the seventh exemplary embodiment, wherein the cycle of the pulse emission is approximately the same as the oscillation cycle of the micromirror in the oscillation state.

A ninth exemplary embodiment of the present invention provides the display apparatus according to the seventh exemplary embodiment, wherein the cycle of the pulse emission is approximately the same as a value obtained by n times the oscillation cycle of the micromirror in the oscillation state, where "n" is a positive integer.

A tenth exemplary embodiment of the present invention provides the display apparatus according to the first exemplary embodiment, wherein the light source performs none of the pulse emission when a plurality of pixels of the spatial light modulator is in an OFF state.

An eleventh exemplary embodiment of the present invention provides the display apparatus according to the first exemplary embodiment, wherein the light source performs a plurality of times of pulse emission during a period in which the spatial light modulator is controlled under a modulation state.

A twelfth exemplary embodiment of the present invention provides the display apparatus according to the first exemplary embodiment, wherein the controller controls the spatial light modulator so that the light intensities of a display image are changed by using a plurality of widths of the pulse emission during a period in which the spatial light modulator is controlled under a modulation state.

A thirteenth exemplary embodiment of the present invention provides the display apparatus according to the first exemplary embodiment, wherein the controller controls the spatial light modulator so that the light intensities of a display image are changed by using a plurality of times of the pulse emission with different intensities during a period in which the spatial light modulator is controlled under a modulation state.

A fourteenth exemplary embodiment of the present invention provides the display apparatus according to the first exemplary embodiment, wherein the controller controls the spatial light modulator so that the light intensities of a display image are changed by using a plurality of times of the pulse emission with different cycles during a period in which the spatial light modulator is controlled under a modulation state.

A fifteenth exemplary embodiment of the present invention provides the display apparatus according to the first exemplary embodiment, wherein the controller controls the spatial light modulator so that the light intensities of a projection image are changed by using multiple pulse emissions with different widths during the frame period of a video image or during the sub-frame thereof.

A sixteenth exemplary embodiment of the present invention provides the display apparatus according to the first exemplary embodiment, wherein the controller controls the spatial light modulator so that the light intensities of a projection image are changed by using multiple pulse emissions with different intensities during the frame period of a video image or during the sub-frame thereof.

A seventeenth exemplary embodiment of the present invention provides the display apparatus according to the first exemplary embodiment, wherein the controller controls the spatial light modulator so that the light intensities of a projection image are changed by using multiple pulse emissions with different cycles during the frame period of a video image or during the sub-frame thereof.

An eighteenth exemplary embodiment of the present invention provides the display apparatus according to the first exemplary embodiment, wherein the control controls the light source so that the pulse emission is so performed as to include at least a part of the transition time of modulation states of the spatial light modulator.

A nineteenth exemplary embodiment of the present invention provides the display apparatus according to the first exemplary embodiment, wherein the controller converts an inputted binary video signal into a non-binary video signal, and the modulation of the spatial light modulator is controlled on the basis of the non-binary signal.

A twentieth exemplary embodiment of the present invention provides a display apparatus comprising light sources for emitting multiple luminous fluxes of color lights, a spatial light modulator for modulating the multiple luminous fluxes of color lights from the light source, and a controller for processing inputted video image information and for controlling the light source and spatial light modulator; the controller generates multiple color video signals constituting a video image on the basis of the video image information and causes at least two of the color light sources, from among the plurality of color light sources, to emit light during a period shorter than a period in which the spatial light modulator is controlled under a modulation state using the video image signal of one color from among the video image signals, wherein the emission of at least two of the color light sources is a pulse emission that is a color sequence emission.

A twenty-first exemplary embodiment of the present invention provides the display apparatus according to the twentieth exemplary embodiment, wherein the controller controls the light source so as to perform pulse emission in a sequential emission of all colors from multiple color light sources for a period shorter than a period in which the spatial light modulator is controlled under a modulation state.

A twenty-second exemplary embodiment of the present invention provides the display apparatus according to the twentieth exemplary embodiment, wherein a period in which the spatial light modulator is controlled under a modulation state is a minimum unit of time in which the spatial light modulator is controlled under the modulation state on the basis of the video image information.

A twenty-third exemplary embodiment of the present invention provides the display apparatus according to the twentieth exemplary embodiment, wherein the minimum unit of time is a period of time in accordance with a period of time for loading, onto the pixel of the spatial light modulator, a minimum unit of data to control the gradation of the brightness of the spatial light modulator on the basis of the video image information.

A twenty-fourth exemplary embodiment of the present invention provides the display apparatus according to the twentieth exemplary embodiment, wherein the light source is a light emitting diode (LED) or laser light source.

A twenty-fifth exemplary embodiment of the present invention provides the display apparatus according to the twentieth exemplary embodiment, wherein the spatial light modulator is controlled under a plurality of modulation states in accordance with a control signal from the control means.

A twenty-sixth exemplary embodiment of the present invention provides the display apparatus according to the twentieth exemplary embodiment, further comprising a projector, wherein the spatial light modulator is a mirror device comprising a plurality of micromirrors, and the projector projects the modulation light of the spatial light modulator.

A twenty-seventh exemplary embodiment of the present invention provides the display apparatus according to the twenty-sixth exemplary embodiment, wherein the spatial light modulator is controlled under an ON state for guiding the luminous flux emitted from the light source to the projector, an OFF state for guiding the luminous flux emitted from the light source away from the projector and an oscillation state that is between the ON state and OFF state.

A twenty-eighth exemplary embodiment of the present invention provides the display apparatus according to the twenty-sixth exemplary embodiment, wherein the respective cycles of the pulse emission of the at least two colors are approximately the same as the oscillation cycle of the micromirror in the oscillation state.

A twenty-ninth exemplary embodiment of the present invention provides the display apparatus according to the twenty-sixth exemplary embodiment, wherein the respective cycles of the pulse emission of the at least two colors are approximately the same as a value obtained by n times the oscillation cycle of the micromirror in the oscillation state, where "n" is a positive integer.

A thirtieth exemplary embodiment of the present invention provides the display apparatus according to the twentieth exemplary embodiment, wherein the pulse width of an individual pulse emission in the color sequential emission of the light sources(s) having at least two colors is a certain ratio to a period for performing a modulation control of the spatial light modulator.

A thirty-first exemplary embodiment of the present invention provides the display apparatus according to the twentieth exemplary embodiment, wherein the pulse width of a single pulse emission in the color sequential emission of the light sources(s) having at least two colors is a predetermined value.

A thirty-second exemplary embodiment of the present invention provides the display apparatus according to the twentieth exemplary embodiment, wherein the pulse widths of a single pulse emission in the color sequential emission of the light sources(s) having at least two colors can be arbitrarily changed.

A thirty-third exemplary embodiment of the present invention provides the display apparatus according to the twentieth exemplary embodiment, wherein the color balance of a display video image is adjusted by changing the pulse widths of a single pulse emission in the color sequential emission of the light sources(s) having at least two colors.

A thirty-fourth exemplary embodiment of the present invention provides the display apparatus according to the twentieth exemplary embodiment, wherein the cycles of a single pulse emission in the color sequential emission of the light sources(s) having at least two colors can be arbitrarily changed.

A thirty-fifth exemplary embodiment of the present invention provides the display apparatus according to the twentieth exemplary embodiment, wherein the color balance of a display video image is adjusted by changing the cycles of a single pulse emission in the color sequential emission of the light sources(s) having at least two colors.

A thirty-sixth exemplary embodiment of the present invention provides the display apparatus according to the twentieth exemplary embodiment, wherein the component of a synthesized color within a displayed video image is increased by changing the respective cycles of the pulse emission of at least two colors, and thereby the brightness of the displayed video image is increased.

A thirty-seventh exemplary embodiment of the present invention provides the display apparatus according to the twentieth exemplary embodiment, wherein sequential emission of the light sources of a plurality of colors are multiple pulse emission of the light sources(s) having at least three colors, and adjusting the pulse width of the pulse emissions of the respective colors increases the white component within a displayed video image, thereby increasing the brightness thereof.

A thirty-eighth exemplary embodiment of the present invention provides a display apparatus comprising a spatial light modulator, an light source for illuminating the spatial light modulator, and a projector for projecting light incoming by way of the spatial light modulator, wherein the light source emits a luminous flux or luminous fluxes having a plurality of colors, and a light source control unit for controlling the modulation of the pulse emission of the light source(s), wherein the light source control unit controls the light source(s) so that the luminous flux(es) is(are) color sequential light having a plurality of colors and also changes the ratios of widths or intensities of the pulse emission of the light source or a plurality thereof, thereby producing the illumination light having a different color for each frame or sub-frame constituting a video image.

DESCRIPTION OF THE PREFERRED EMBODIMENTS

The following is a detailed description of the preferred embodiments of the present invention with reference to the accompanying drawings. More specifically, the following description is provided for the application of the present invention to a projection apparatus as an example of display apparatuses.

Figure 1:
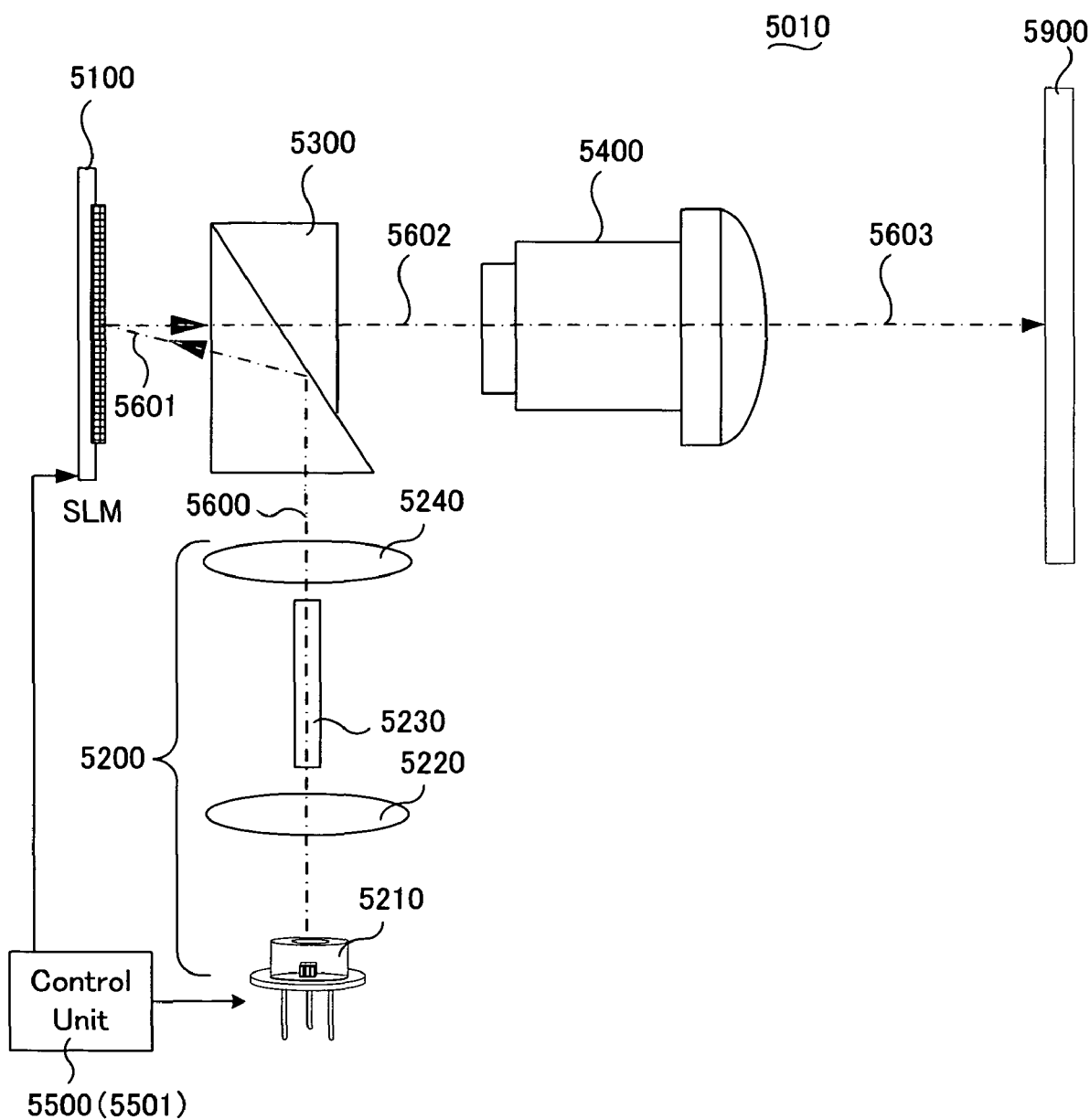
FIG. 1 is a functional block diagram showing the configuration of a projection apparatus according to a preferred embodiment of the present invention.

FIG. 1 is a functional block diagram for showing the configuration of a single panel projection apparatus according to a preferred embodiment of the present invention. Specifically, FIG. 1 shows a projection apparatus 5010 that includes a single spatial light modulator (SLM) 5100, a control unit 5500, a Total Internal Reflection (TIR) prism 5300, a projection optical system 5400 and a light source optical system 5200. The projection apparatus 5010 is commonly referred to as a single-panel projection apparatus 5010 because the apparatus is implemented with a single spatial light modulator 5100.

The projection optical system 5400 is implemented with a spatial light modulator 5100 and TIR prism 5300 disposed on the optical axis of the projection optical system 5400, and the light source optical system 5200 is placed with a configuration to have an optical axis matches the optical axis of the projection optical system 5400.

The TIR prism 5300 receives the incoming illumination light 5600 projected from the light source optical system 5200 and directs the light to transmit as incident light 5601 to the spatial light modulator 5100 at a prescribed inclination angle. The SLM 5100 further reflects and transmits a reflection light 5602 towards the projection optical system 5400.

The projection optical system 5400 projects the reflection light 5602 from the SLM 5100 and TIR prism 5300 onto a screen 5900 as projection light 5603. The light source optical system 5200 comprises a adjustable light source 5210 for generating the illumination light 5600, a condenser lens 5220 for focusing the illumination light 5600, a rod type condenser body 5230 and a condenser lens 5240.

The adjustable light source 5210, condenser lens 5220, rod type condenser body 5230 and condenser lens 5240 are sequentially placed in the aforementioned order in the optical axis of the illumination light 5600 emitted from the adjustable light source 5210 and incident to the side face of the TIR prism 5300.

The projection apparatus 5010 employs a single spatial light modulator 5100 for implementing a color display on the screen 5900 by means of a sequential color display method.

Specifically, the adjustable light source 5210, comprising a red 5211, a green 5212, and a blue laser light source 5213 (not shown in the drawing), allows independent control of the light emission states. The controller of the adjustable light source divides one frame of display data into a plurality of sub-fields (i.e., three sub-fields, specifically, red (R), green (G) and blue (B) in the present case) and makes each of the laser light sources, the red 5211, green 5212 and blue 5213, emit each respective light in time series at the time band corresponding to the sub-field of each color, as will be described later.

Figure 2:
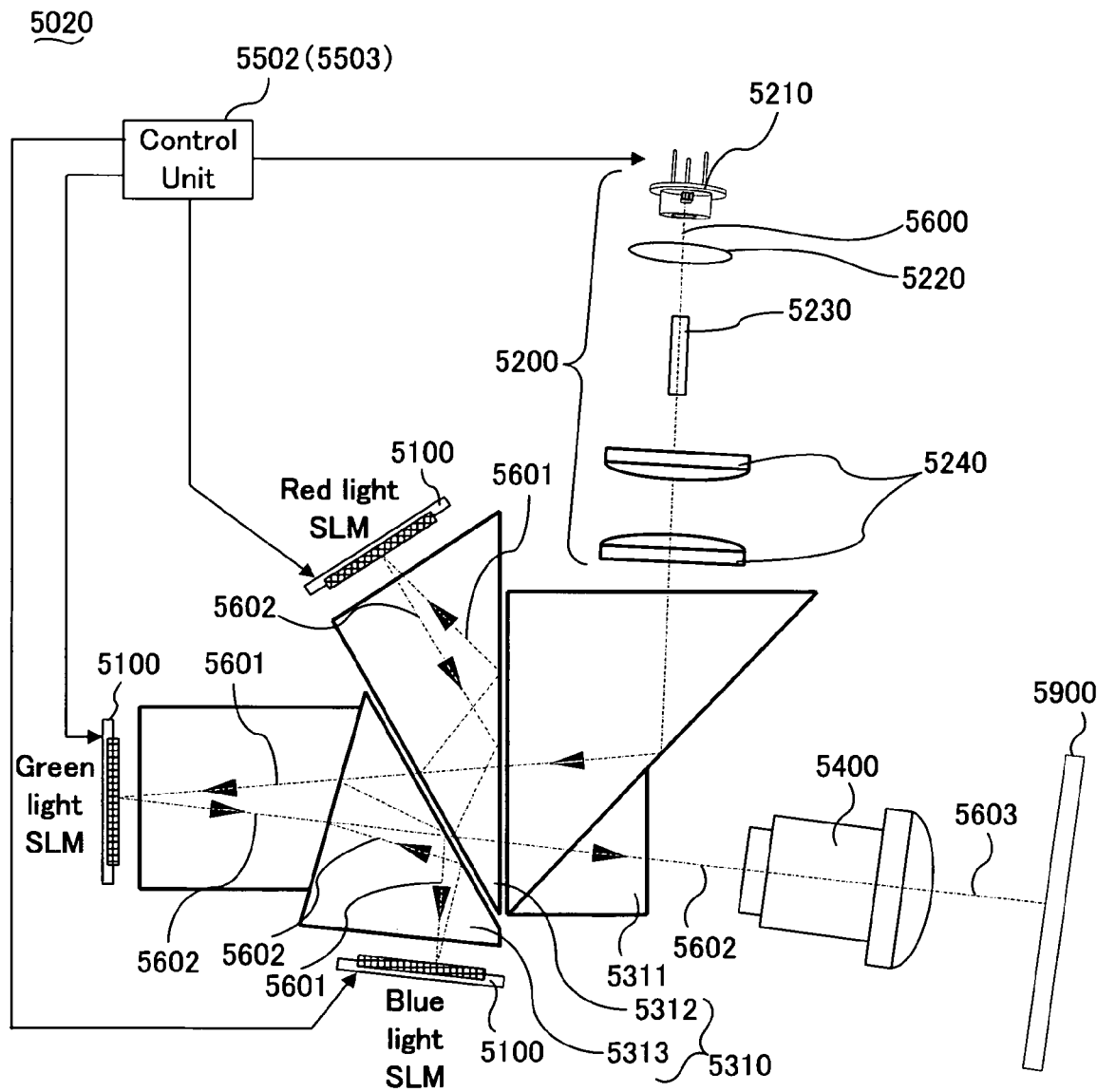
FIG. 2 is a functional block diagram showing the configuration of a single-panel looks like a multi-panel to me projection apparatus according to another preferred embodiment of the present invention.

FIG. 2 is a functional block diagram showing the configuration of a projection apparatus according to another preferred embodiment of the present invention. The projection apparatus 5020 is commonly referred to as a multi-plate projection apparatus comprising a plurality of spatial light modulators 5100 instead of a single SLM included in the single-panel projection apparatus 5010 described above. Furthermore, the projection apparatus 5020 comprises a control unit 5502 in place of the control unit 5500. The projection apparatus 5020 comprises a plurality of spatial light modulators 5100, and further includes a light separation/synthesis optical system 5310 between the projection optical system 5400 and each of the spatial light modulators 5100.

The light separation/synthesis optical system 5310 comprises a plurality of TIR prisms, i.e., TIR prism 5311, TIR prism 5312, and TIR prism 5313.

The TIR prism 5311 functions to direct the illumination light 5600, projected along the optical axis of the projection optical system 5400, to the spatial light modulator 5100 as incident light 5601.

The TIR prism 5312 functions to separate the red (R) light from an incident light 5601, projected by way of the TIR prism 5311, transmitting the red light incident to the red light-use spatial light modulators 5100, and further directs the reflection light 5602 of the red light to the TIR prism 5311.

Likewise, the TIR prism 5313 functions to separate the blue (B) and green (G) lights from the incident light 5601, projected by way of the TIR prism 5311, and transmits them to the blue color-use spatial light modulator 5100 and green color-use spatial light modulator 5100, and further functions to direct the reflection light 5602 of the green light and blue light to the TIR prism 5311.

Therefore, the spatial light modulations of these three colors of R, G and B are simultaneously performed at three spatial light modulators 5100, respectively. The reflection lights, resulting from the respective modulations, are projected onto the screen 5900 as the projection light 5603 by way of the projection optical system 5400, and thus a color display is carried out. Note that the system may implement various modifications by using a light separation/synthesis optical system instead of being limited to the light separation/synthesis optical system 5310 described above.

Figure 3A:
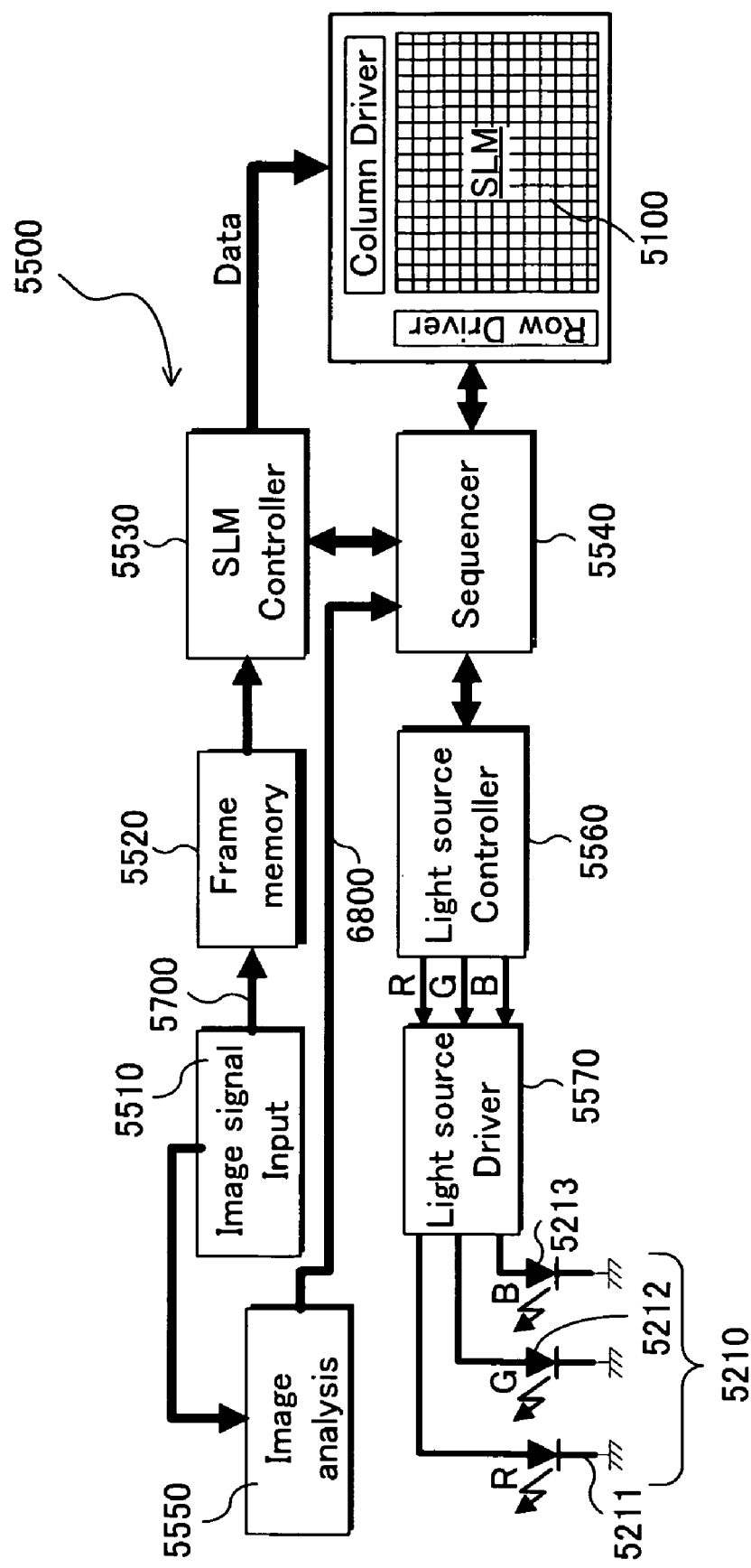
FIG. 3A is a functional block diagram exemplifying the configuration of a control unit comprised in a single-panel projection apparatus according to a preferred embodiment of the present invention.

FIG. 3A is a functional block diagram exemplifying the configuration of a control unit comprised in a single-panel projection apparatus according to a preferred embodiment of the present invention. The control unit 5500 comprises a frame memory 5520, an SLM controller 5530, a sequencer 5540, a video image analysis unit 5550, a light source control unit 5560, and a light source drive circuit 5570.

The sequencer 5540 includes a microprocessor to control the operation timing of the entire control unit 5500 and the spatial light modulators 5100.

In one exemplary embodiment, the frame memory 5520 one frame of input digital video data 5700 received from an external device (not shown figure) connected to a video signal input unit 5510. The input digital video data 5700 is updated, in real time, every time the display of one frame is completed.

The SLM controller 5530 processes the input digital video data 5700 read from the frame memory 5520, as described later. The SLM controller 5530 separates the read data into a plurality of sub-fields 5701 through 5703, and outputs them to the spatial light modulators 5100 as binary data 5704 and non-binary data 5705, which are used for implementing an ON/OFF control and an oscillation control (which are described later) of a mirror 5112 of the spatial light modulator 5100.

The sequencer 5540 outputs a timing signal to the spatial light modulators 5100 in sync with the generation of the binary data 5704 and non-binary data 5705 at the SLM controller 5530.

The video image analysis unit 5550 outputs a video image analysis signal 6800 used for generating various light source patterns (which are described later) corresponding to the input digital video data 5700 inputted from the video signal input unit 5510.

The light source control unit 5560 controls the light source drive circuit 5570 to control the operation of the adjustable light source 5210 by using a light source profile control signal in emitting the illumination light 5600. The light source profile control signal is generated from the video image analysis signal 6800 by the video image analysis unit 5550 using data from the light source pulse patterns 5801 through 5811 generated by the sequencer 5540, as will be further described below.

The light source drive circuit 5570 operates to drive the red 5211, green 5212 and blue 5213 laser light sources of the adjustable light source 5210 to emit light. The light source generates the light source pulse patterns 5801 through 5811 (which are described later) received from the light source control unit 5560.

Figure 3B:
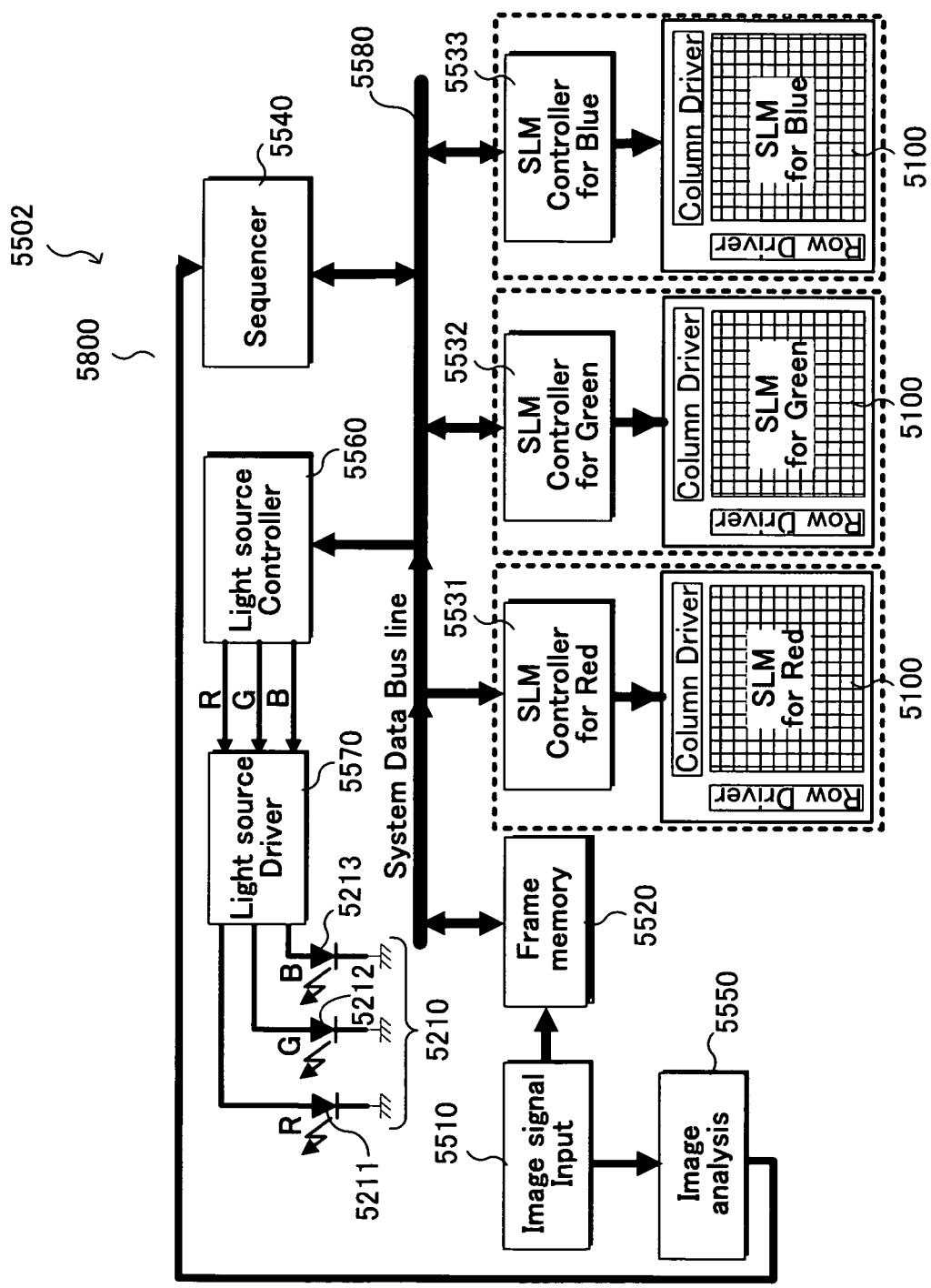
FIG. 3B is a functional block diagram exemplifying the configuration of a control unit comprised in a multi-panel projection apparatus according to a preferred embodiment of the present invention.

FIG. 3B is a functional block diagram exemplifying the configuration of a control unit comprised in a multi-panel projection apparatus according to the present embodiment.

The control unit 5502 comprises a plurality of SLM controllers 5531, 5532 and 5533 that are used for controlling each of the spatial light modulators 5100. Each of the modulators is implemented for modulating the respective colors R, G and B, and the configuration of the controllers is the main difference between the control unit 5502 and the control unit 5500 described in FIG. 3A.

Specifically, each of the SLM controllers 5531, 5532 and 5533 is implemented to process the modulation of its respective color R, G, and B. Each modulator is supported on the same substrates as those of the respective spatial light modulators 5100. This configuration makes it possible to place the individual spatial light modulators 5100 and the corresponding SLM controllers 5531, 5532 and 5533 close to each other, thereby enabling a high-speed data transfer rate.

Furthermore, a system bus 5580 is used to connect the frame memory 5520, light source control unit 5560, sequencer 5540 and SLM controllers 5531 through 5533, in order to speed up and simplify the connection path of each connecting element.

Figure 4A:
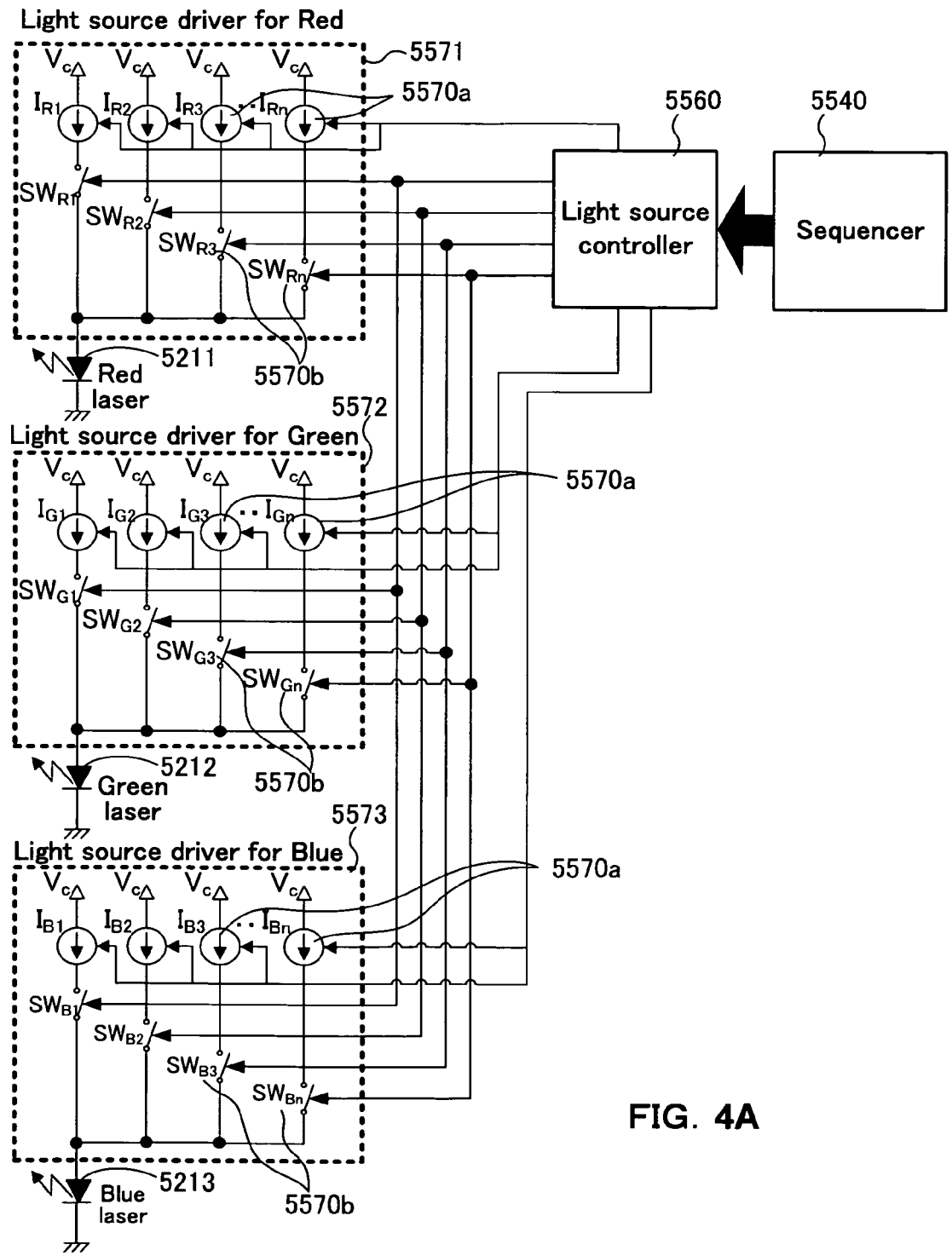
FIG. 4A is a block diagram for showing the configuration of a light source drive circuit of a projection apparatus according to a preferred embodiment of the present invention.

FIG. 4A is a circuit block diagram for illustrating the configuration of the light source drive circuit 5570 (i.e., the light source drive circuits 5571, 5572 and 5573) according to the present embodiment.

The light source drive circuit shown in FIG. 4A comprises a plurality of constant current circuits 5570a (i.e., I (R, G, B)$_1$ through I (R, G, B)$_n$) and a plurality of switching circuits 5570b (i.e., switching circuits SW (R, G, B)$_1$ through SW (R, G, B)$_n$), corresponding to the respective constant current circuits 5570a, in order to generate the desired light intensities. The light emissions are shown as P$_1$ through P$_n$ for the light source optical system 5200 (i.e., the red 5211, green 5212, and blue 5213 laser light sources).

The switching circuits 5570b each carries out a switching in accordance with a desired emission profile of the light source optical system 5200 (i.e., the red 5211, green 5212 or blue 5213 laser light source).

The setup values of the output current of the constant current circuits 5570a (i.e., constant current circuits I (R, G, B)$_n$), when the gray scale of the emission intensity of the light source optical system 5200 is designated at N bits (where N≧n), are as follows:

$$I(R,G,B)_1 = I_{th} + \text{LSB}$$

$$I(R,G,B)_2 = \text{LSB} + 1$$

$$I(R,G,B)_3 = \text{LSB} + 2$$

...

...

$$I(R,G,B)_n = \text{MSB}$$

In this exemplary embodiment, a gray scale display is controlled on the basis of the emission intensity. A similar gray scale display is achievable even if the emission period (i.e., an emission pulse width) and the emission interval (i.e., an emission cycle) are variable.

The relationship between the emission intensity P$_n$ of the adjustable light source and drive current for each color in this case is as follows. Note that "k" is an emission efficiency corresponding to the drive current:

$$P_1 = k^*(I_{th} + I_1)$$

$$P_2 = k^*(I_{th} + I_1 + I_2)$$

...

...

$$P_n = k^*(I_{th} + I_1 + I_2 + \ldots + I_{n-1} + I_n)$$

Figure 4B:
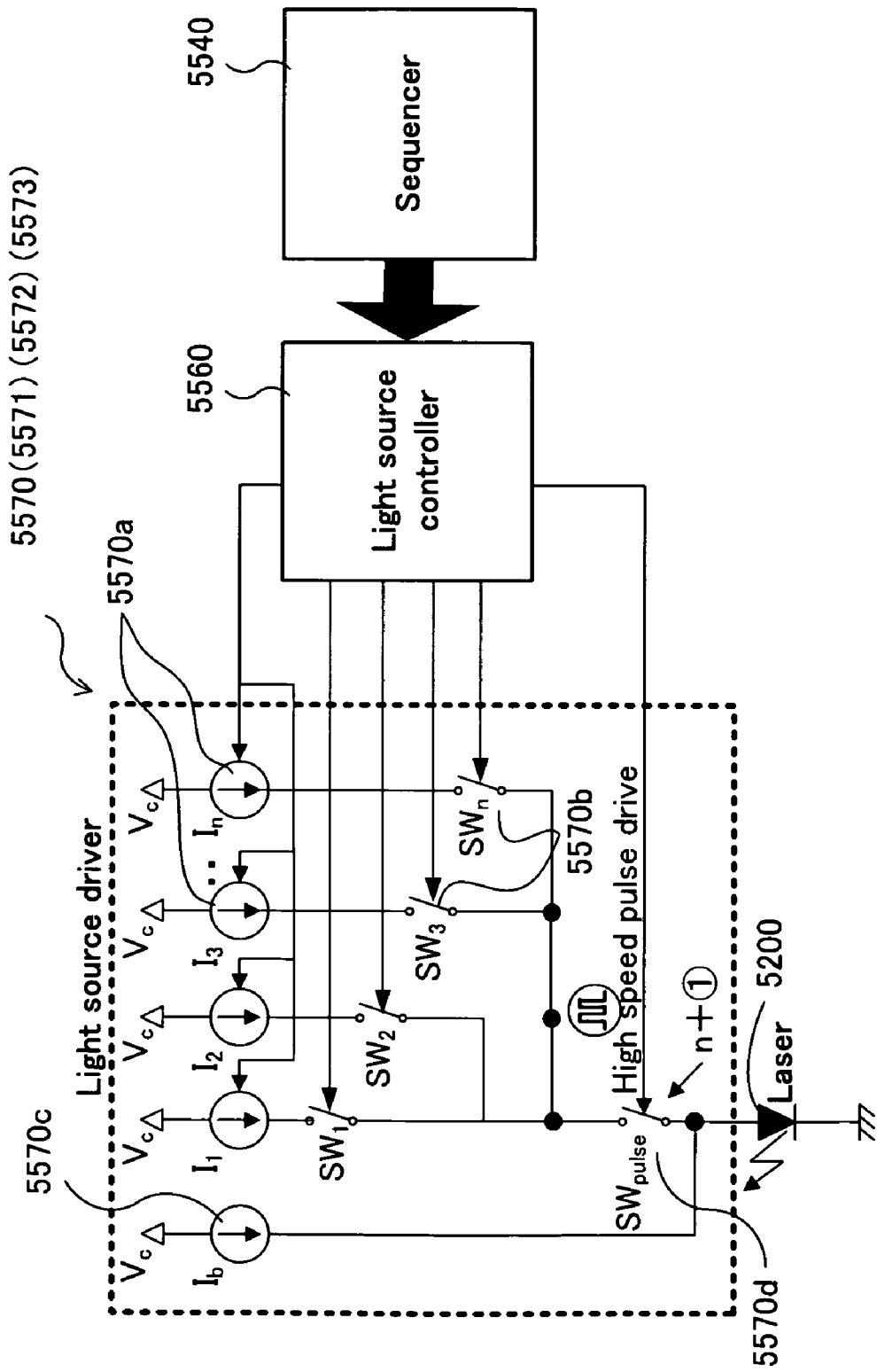
FIG. 4B is a block diagram showing an exemplary modification of the configuration of a light source drive circuit of a projection apparatus according to a preferred embodiment of the present invention.

FIG. 4B is a block diagram showing a modified embodiment of the configuration of the light source drive circuit according to the present embodiment.

For simplicity, FIG. 4B denotes the constant current circuits 5570a (I (R, G, B)$_1$ through I (R, G, B)$_n$) as I$_1$ through I$_n$ and the switching circuits 5570b (SW (R, G, B)$_1$ through SW (R, G, B)$_n$) as switching circuits 5570b (SW$_1$ through SW$_n$).

As described later, the light source drive circuits 5570, according to the present embodiment, are configured to control the individual constant current circuit 5570a (i.e., I (R, G, B)$_1$ in this case) to supply a current value equivalent to the threshold current I$_{th}$ of the light source optical system 5200. Alternately, the individual constant current circuit supplies a current close to the aforementioned threshold current, as a bias current I$_b$ when a semiconductor laser or similar light source is used as the light source optical system 5200. By using a high-speed current drive, the respective switching operations of the light source drive circuits 5570 are stabilized to provide a high-speed emission.

The light source drive circuits 5570 (i.e., the light source drive circuits 5571, 5572, and 5573) shown in FIG. 4B comprise a bias current circuit 5570c, which are continuously connected to the light source optical systems 5200 (i.e., the red 5211, green 5212, and blue 5213 laser light sources) and which are used for applying a bias current I$_b$, in addition to the constant current circuits 5570a Furthermore, the connection of the constant current circuits 5570a to the light source optical systems 5200 is configured through a switching circuit 5570d (SW$_{pulse}$) formed on the downstream side of the switching circuits 5570b.

In the case of the configuration shown in FIG. 4B, the relationship between the emission intensity P$_n$ and the drive current of the adjustable light source for each wavelength is as follows, where "k" is the emission intensity in terms of drive current:

$$P_b = k^* I_b (I_b \approx I_{th})$$

$$P_1 = k^* (I_{th} + I_1)$$

$$P_2 = k^* (I_{th} + I_1 + I_2)$$

...

...

$$P_n = k^* (I_{th} + I_1 + I_2 + \ldots + I_{n-1} + I_n)$$

Specifically, the relationship between each switching operation and emission output is as follows:

$$SW_{pulse} = \text{OFF}: P_b = k^* I_b \approx 0 \text{ [mW] (where } I_b \approx I_{th})$$

$$SW_1: P_1 = k^* (I_b + I_1)$$

$$SW_2: P_2 = k^* (I_b + I_1 + I_2)$$

...

...

$$SW_n: P_n = k^* (I_b + I_1 + I_2 + \ldots I_{n-1} + I_n)$$

With this, it is possible to attain an emission profile possessing an emission intensity $P_b$ that is nearly zero.

FIG. 4B shows an embodiment wherein the switching circuits 5570d can carry out a circuit operation unaffected by a drive current switching over, which may be caused by the switching circuits 5570b (SW$_1$ through SW$_n$). Each of the switching circuits 5570b is connected to the respective constant current circuits 5570a. Particularly, a further function is carried out in that when the adjustable light source 5210 is not emitting light, the switching circuits (SW$_1$ through SW$_n$) are switched over adjustable light source.

While the bias current value is designated at a fixed current value in the configuration of FIG. 4B, it is also possible to connect the constant current circuit 5570c to the light source control unit 5560 and allow a variable bias current.

Figure 5:
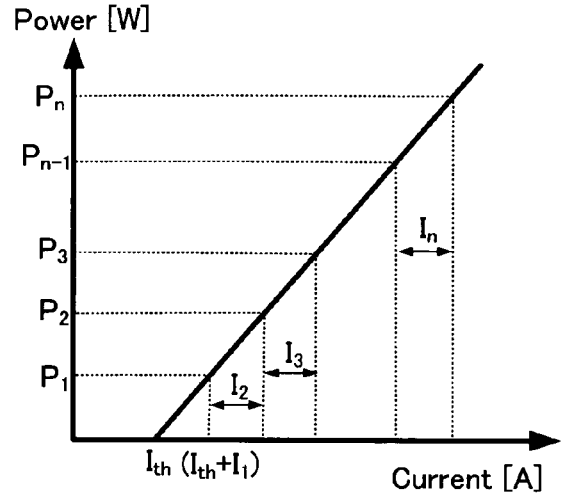
FIG. 5 is a chart showing the relationship between the emission light intensity and the applied current of the light source drive circuit of the embodiment of the present invention.

FIG. 5 is a diagram showing the relationship between the applied current I and the emission intensity $P_n$ of the light source drive circuit shown in the above described FIG. 4A.

Figure 6:
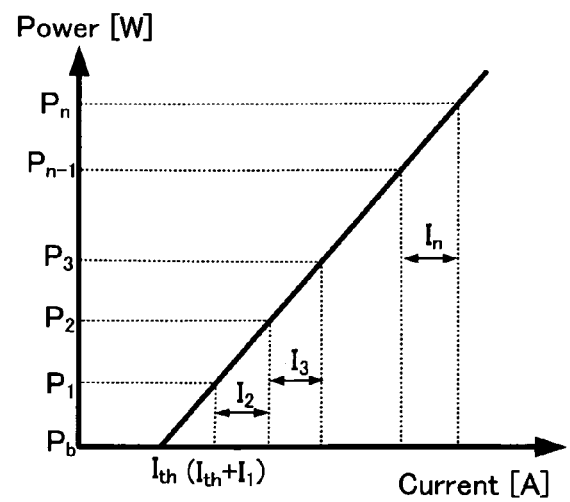
FIG. 6 is a chart showing the relationship between the emission light intensity and the applied current of the constant current circuit of the light source drive circuit of the embodiment of the present invention.

FIG. 6 is a diagram showing the relationship between the applied current I and the emission intensities $P_b$ and $P_n$ of the constant current circuit 5570a of the light source drive circuit shown in the above described FIG. 4B.

Note that the descriptions for FIGS. 4A and 4B have been provided for the case of changing the emission profiles of the adjustable light source for each sub-frame corresponding to each gray scale bit. If the display gray scale function of the spatial light modulator 5100 is used in parallel, the number of required levels of electrical current decreases, thus reducing the number of constant current circuits 5570a and switching circuits 5570b. It is therefore possible to obtain the number of gray scales equal to, or higher than, the gray scales achievable through the modulation process of the spatial light modulator 5100.

The following detail description explains the configuration of the spatial light modulator 5100 according to the present embodiment.

Figure 7:
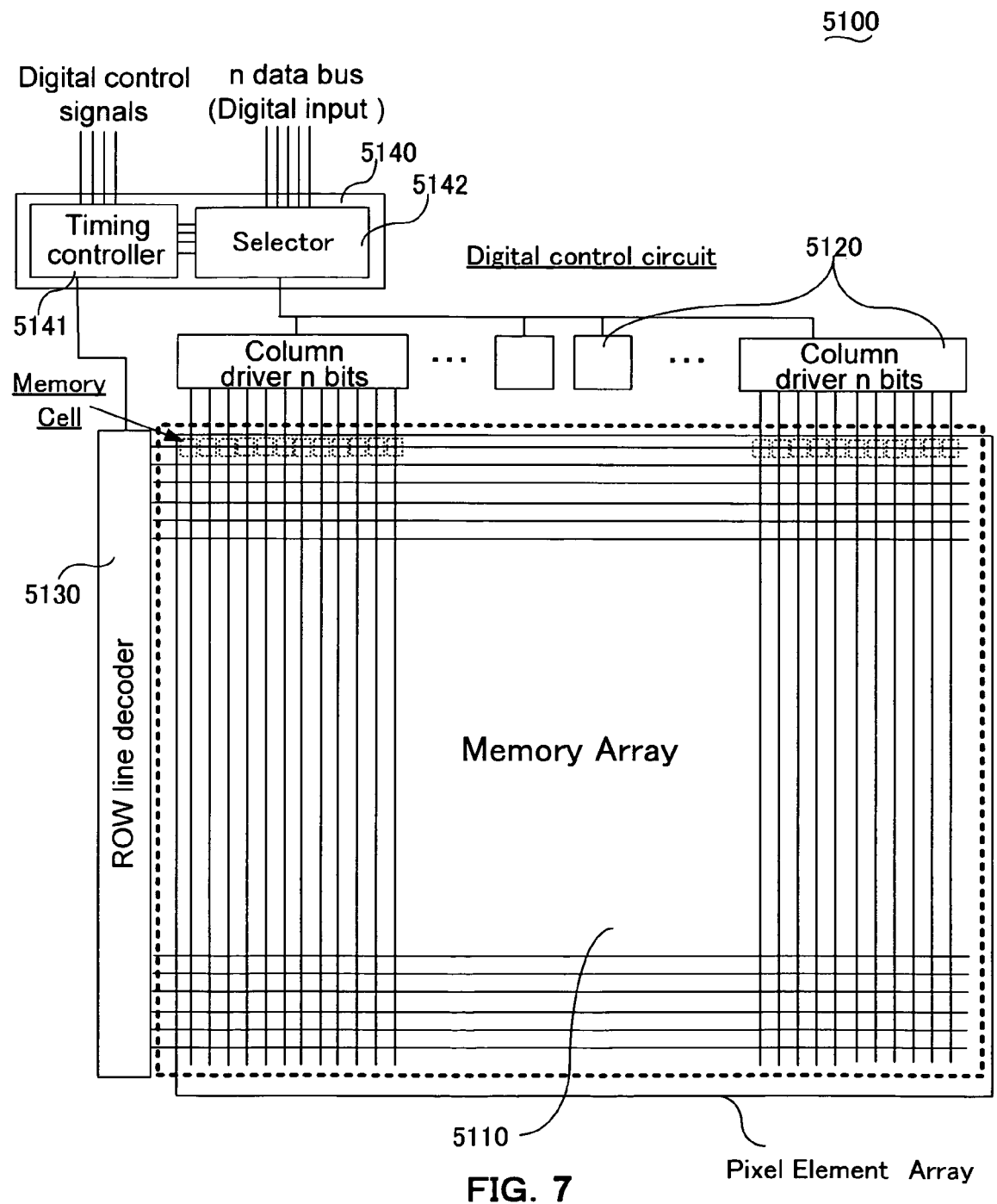
FIG. 7 is a circuit diagram for showing the layout of the internal configuration of a spatial light modulator according to the embodiment of the present invention.
Figure 8:
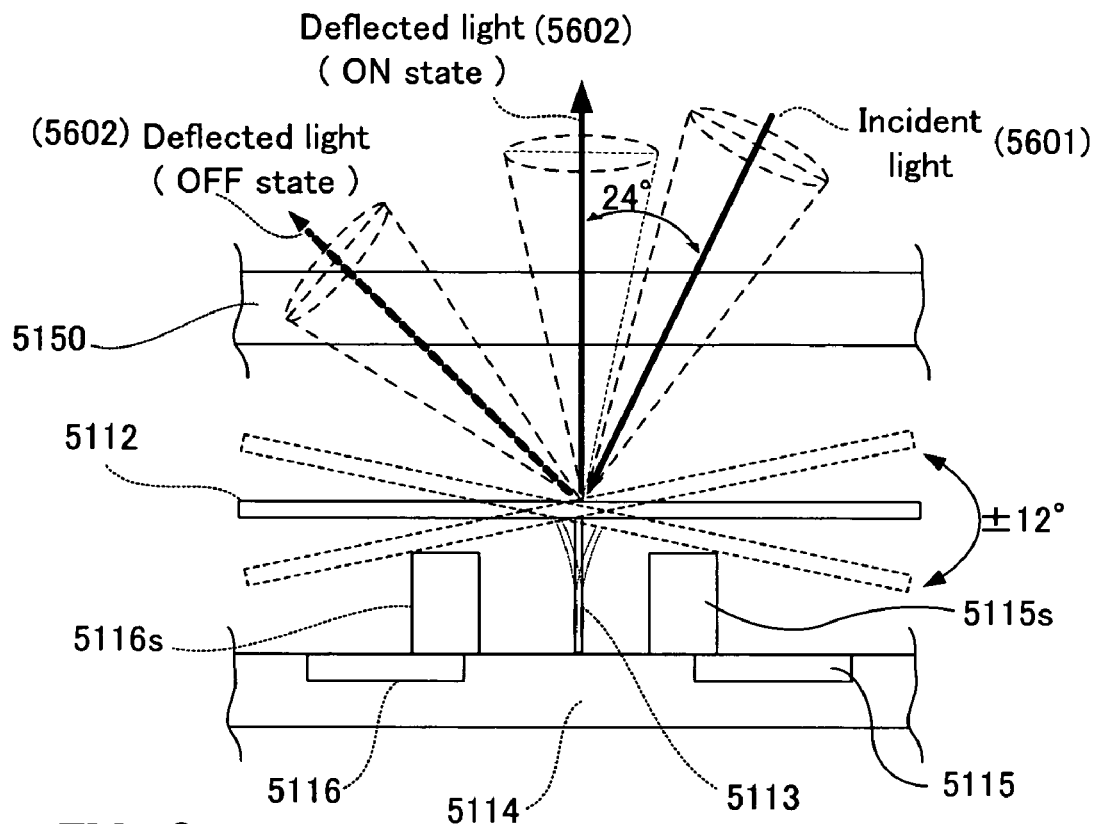
FIG. 8 is a cross-sectional diagram of an individual pixel part constituting a spatial light modulator according to the embodiment of the present invention.
Figure 9:
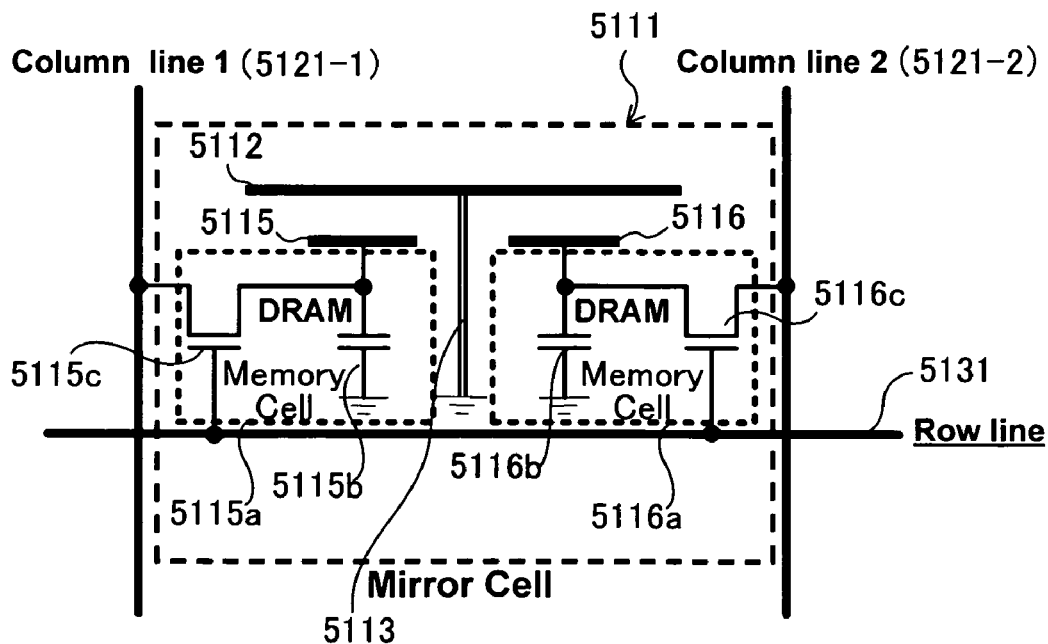
FIG. 9 is a side cross sectional view for showing the configuration of an individual pixel unit constituting a spatial light modulator according to the embodiment of the present invention.

The spatial light modulator 5100 according to the present embodiment is a deflectable mirror device with an array of mirror elements. FIG. 7 is a schematic circuit diagram exemplifying the layout of the internal configuration of the spatial light modulator 5100 according to the present embodiment. FIG. 8 is a cross-sectional diagram of an individual pixel unit implemented in the spatial light modulator 5100 according to the present embodiment. FIG. 9 is a side cross sectional view diagram exemplifying the configuration of an individual pixel unit constituting the spatial light modulator 5100 according to the present embodiment.

FIG. 7 shows an exemplary embodiment of the mirror device 5100 that includes a mirror element array 5110, column drivers 5120, row line decoders 5130 and an external interface unit 5140. The external interface unit 5140 includes a timing controller 5141 and a selector 5142. The timing controller 5141 controls the row line decoder 5130 on the basis of a timing signal from the SLM controller 5530. The selector 5142 supplies the column driver 5120 with digital signal incoming from the SLM controller 5530. A plurality of mirror elements are arrayed as a mirror element array 5110 at the positions aligned with individual bit lines 5121. The bit lines are vertically extended from the column drivers 5120, crossing individual word lines 5131. The word lines are horizontally extended from the row line decoders 5130.

As shown in FIG. 8, the individual mirror element 5111 includes a mirror 5112 supported on a substrate 5114 by a hinge 5113 to deflect within a range of deflection angles. The mirror 5112 is covered with a cover glass 5150 for protection.

An OFF electrode 5116 (and an OFF stopper 5116s) and an ON electrode 5115 (and an ON stopper 5115s) are placed symmetrically across the hinge 5113 on the substrate 5114.

The OFF electrode 5116 attracts the mirror 5112 with a coulomb force by applying a predetermined voltage and tilts the mirror 5112 to make contact with the OFF stopper 5116s. This causes the incident light 5601, incident to the mirror 5112, to be reflected to the light path of an OFF position, offset from the optical axis of the projection optical system 5400. The state of a mirror (or mirror element) in this condition is called the OFF state.

The ON electrode 5115 attracts the mirror 5112 with a coulomb force by applying a predetermined voltage and tilts the mirror 5112 to make contact with the ON stopper 5115s. This causes the incident light 5601, incident to the mirror 5112, to be reflected to the light path of an ON position, matching the optical axis of the projection optical system 5400. The state of a mirror (or mirror element) in this condition is called the ON state.

Furthermore, in FIG. 9, one mirror element 5111 comprises a mirror 5112, an elastic hinge 5113 for retaining the mirror 5112, address electrodes 5115 and 5116, and two memory cells, i.e., a first memory cell 5115a and a second memory cell 5116a, both of which apply a voltage to the address electrodes 5115 and 5116 in order to control the mirror 5112 under a desired deflection state.

The first and second memory cells 5115a and 5116a each has a dynamic random access memory (DRAM) structure comprising gate transistors (i.e., gate transistors 5115c and 5116c) and a capacitor (i.e., ON capacitor 5115b and OFF capacitor 5116b) in this configuration. The structures of the individual memory cells 5115a and 5116a are not limited as such and may instead be, for example, a static random access memory (SRAM) structure or the like.

Furthermore, the individual memory cells 5115a and 5116a are connected to the respective address electrodes 5115 and 5116, a COLUMN line 1, a COLUMN line 2 and a ROW line.

In the first memory cell 5115a, the gate transistor 5115c is connected between the address electrode 5115 and ROW line, and between the COLUMN line 1 and ROW line. An ON capacitor 5115b is connected between the address electrode 5116 and GND (i.e., the ground). Likewise in the second memory cell 5116a, a gate transistor 5116c is connected between the address electrode 5116 and COLUMN line 2, and between the COLUMN line 2 and ROW line. An OFF capacitor 5116b is connected between the address electrode 5116 and GND.

Controlling the signals on the COLUMN line 1 and ROW line applies a predetermined voltage to the address electrode 5115, thereby making it possible to tilt the mirror 5112 towards the address electrode 5115. Likewise, controlling the signals on the COLUMN line 2 and ROW line applies a predetermined voltage to the address electrode 5116, thereby making it possible to tilt the mirror 5112 towards the address electrode 5116.

Specifically, the ON/OFF of the gate transistors 5116c and 5115c are controlled by ROW line. Specifically, the mirror elements 5111 disposed on one horizontal row along a designated ROW line are simultaneously selected, and the charging and discharging of electrical charge to and from the ON capacitor 511b and 5116b are controlled, thereby turning ON and OFF the mirrors 5112 of individual mirror elements on one horizontal row. Note that a drive circuit for each of the memory cells 5115a and 5116a is commonly formed in the device substrate 5114. Controlling the respective memory cells 5115a and 5116a in accordance with the signal of image data enables control of the deflection angle of the mirror 5112 and carries out the modulation and reflection of the incident light.

Figure 10A:
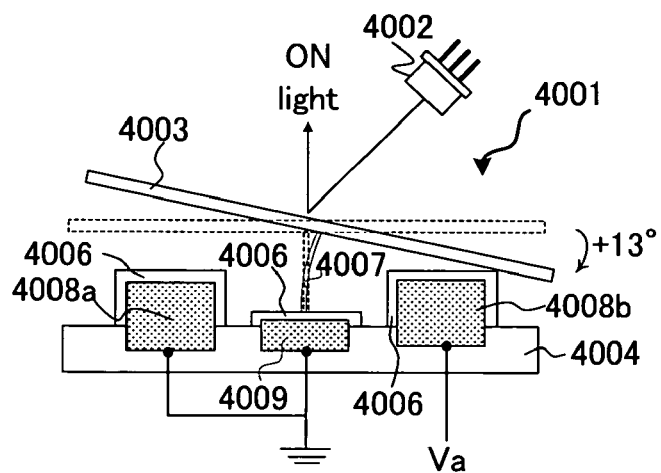
FIG. 10A is a diagram depicting the state in which an incident light is reflected towards a projection optical system by deflecting the mirror of a mirror element according to a preferred embodiment of the present invention.
Figure 10A:
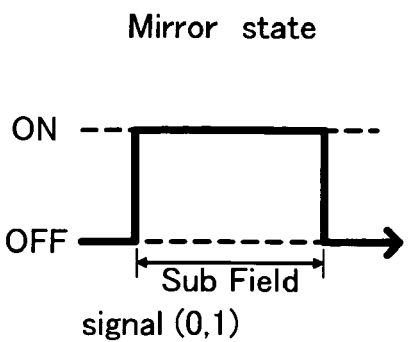
Figure 10B:
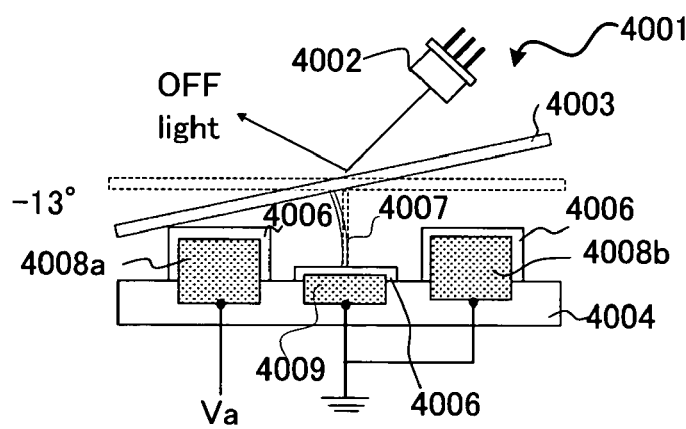
FIG. 10B is a diagram depicting the state in which an incident light is reflected away from a projection optical system by deflecting the mirror of a mirror element according to the embodiment of the present invention.
Figure 10B:
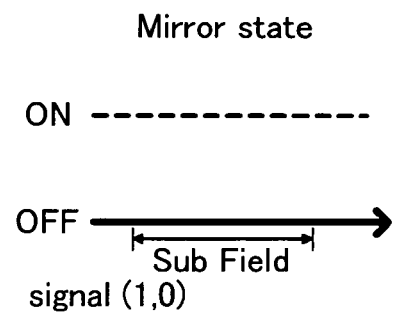
Figure 10C:
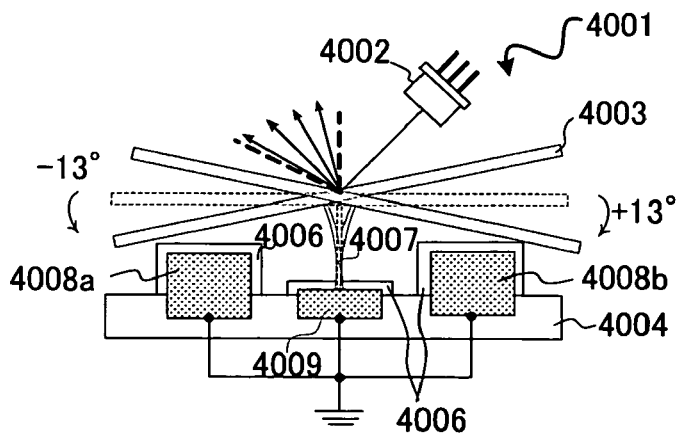
FIG. 10C is a diagram depicting the state in which incident light is reflected towards and away from a projection optical system by the repeated free-oscillation of the mirror of a mirror element according to the embodiment of the present invention.
Figure 10C:
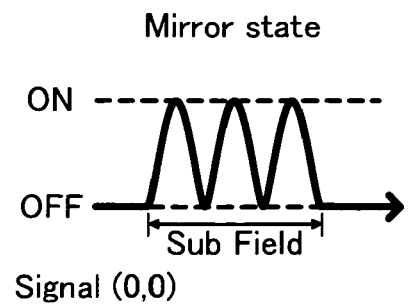

Next is a description of the deflecting operation of the mirror 4003 of the mirror element 4001 shown in FIGS. 8 and 9 with reference to FIGS. 10A, 10B and 10C.

FIG. 10A is a diagram depicting the state in which an incident light is reflected towards a projection optical system by deflecting the mirror of a mirror element.

FIG. 9 shows the memory cells 4010a and 4010b (not shown here) storing the signal (0, 1) which applies a voltage of "0" volts to the address electrode 4008a of FIG. 10A and applies a voltage of Ve volts to the address electrode 4008b. As a result, the mirror 4003 is deflected from a deflection angle of "0" degrees, i.e., the horizontal state, to that of +12 degrees, attracted by a coulomb force, in the direction of the address electrode 4008b to which the voltage of Ve volts is applied. This causes the incident light to be reflected by the mirror 4003 towards the projection optical system (known as the ON light state or ON state).

Specifically the present patent application defines the deflection angles of the mirror 4003 as "+" (positive) for clockwise (CW) direction and "−" (negative) for counterclockwise (CCW) direction, with "0" degrees as the initial state of the mirror 4003. Furthermore, an insulation layer 4006 is provided on the device substrate 4004, and a hinge electrode 4009, connected to the elastic hinge 4007, is grounded through the insulation layer 4006.

FIG. 10B is a diagram depicting the state in which the incident light is not reflected toward a projection optical system by deflecting the mirror of a mirror element. With a signal (1, 0) stored in the memory cells 4010a and 4010b (not shown here), illustrated in detail in FIG. 9, a voltage of Ve volts is applied to the address electrode 4008a, and "0" volts is applied to the address electrode 4008b. As a result, the mirror 4003 is deflected from a deflection angle of "0" degrees, i.e., the horizontal state, to that of −12 degrees in the direction of the address electrode 4008a, to which the voltage of Ve volts is applied. This causes the incident light to be reflected by the mirror 4003 in a direction away from that of the light path towards the projection optical system (known as the OFF light state or OFF state).

FIG. 10C is a diagram depicting the state in which incident light is reflected towards and away from a projection optical system by the repeated free-oscillation of the mirror of a mirror element.

In FIG. 10C, a signal (0, 0) stored in the memory cells 4010a and 4010b (not shown here) applies a voltage of "0" volts to the address electrodes 4008a and 4008b. As a result of zero voltage applied to the electrodes, the coulomb force that has been generated between the mirror 4003 and address electrode 4008a or 4008b is withdrawn so that the mirror 4003 is operated in a free oscillation within the range of the deflection angles ±12 degrees, in accordance with the property of the elastic hinge 4007 (known as the free oscillation state). During the free oscillation, the incident light is reflected towards the projection optical system only when the mirror 4003 is within the range of a specific deflection. The mirror 4003 repeats the free oscillations, changing over frequently between the ON light state and OFF light state. Controlling the number of changeovers makes it possible to finely adjust the intensity of light reflected towards the projection optical system.

The total intensity of light reflected during free oscillation towards the projection optical system is certainly lower than the intensity that is produced when the mirror 4003 is continuously in the ON light state and higher than the intensity that is produced when it is continuously in the OFF light state. Specifically, it is possible to produce an intermediate intensity between the intensities of the ON light state and OFF light state. Therefore, by finely adjusting the light intensity as described above, a higher gradation image can be projected than with the conventional technique.

Although not shown in a drawing, an alternative configuration may be such that only a portion of light is made to enter the projection optical system by reflecting an incident light in the initial state of a mirror 4003. Configuring as such makes the reflection light enter the projection optical system with a higher intensity than when the mirror 4003 is continuously in the OFF light state and with a lower intensity than when the mirror 4003 is continuously in the ON light state, thus controlling the mirror 4003 to operate in an intermediate light state.

A mirror device with an oscillation state and an intermediate light state is more preferable than the conventional mirror device capable of controlling in only two states (i.e., the ON light state and OFF light state) as a device for displaying a next generation image with a higher level of gradation.

The following are descriptions of various preferred embodiments, with the configurations and operations of the projection apparatuses shown in FIGS. 1 through 9 described above. Note that the same alphanumeric designations are assigned to the same constituent component or signal as those already described, and no duplicate description is provided in the following descriptions.

Embodiment 1

Figure 11:
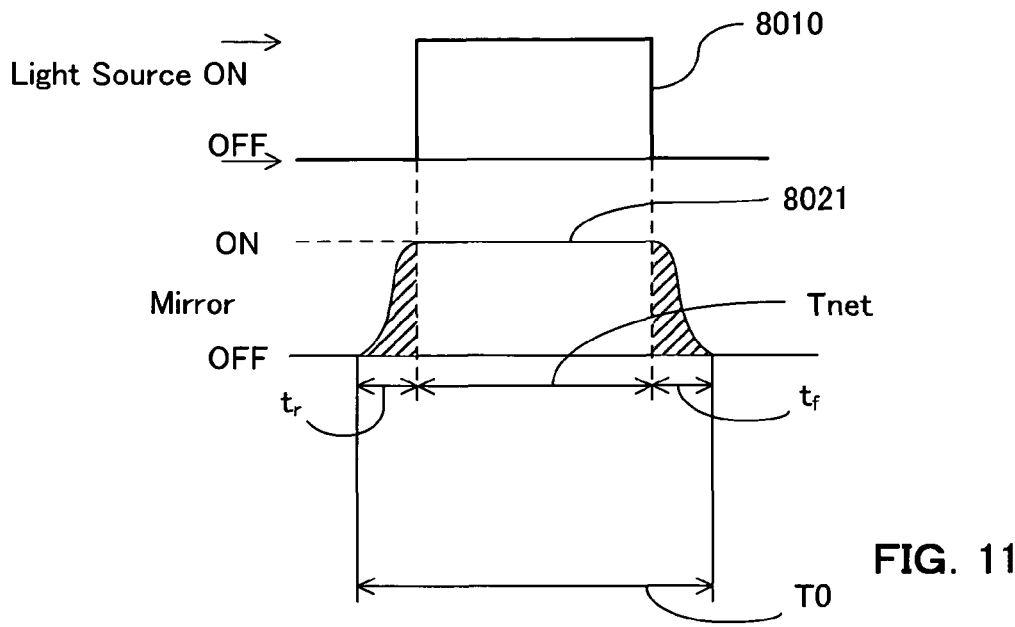
FIG. 11 is a chart exemplifying the operation of a projection apparatus according to a preferred embodiment of the present invention.
Figure 12:
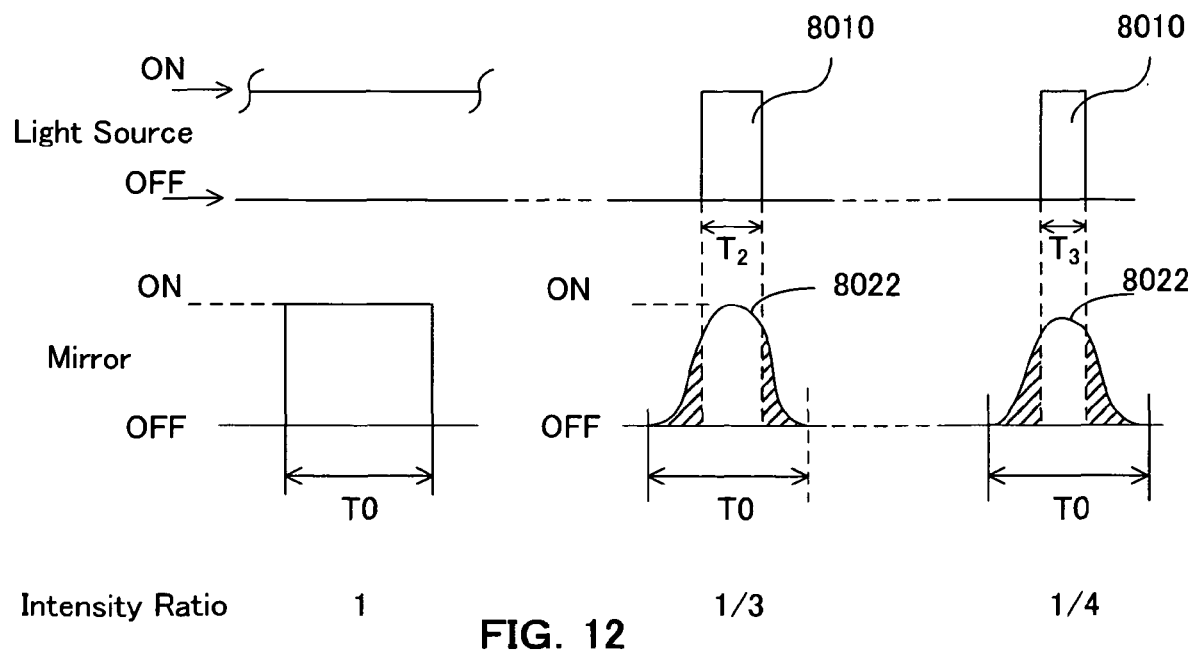
FIG. 12 is a chart exemplifying the operation of a projection apparatus according to a preferred embodiment of the present invention.

FIGS. 11 and 12 are timing diagrams for illustrating the operation sequences of a projection apparatus according to a preferred embodiment of the present invention.

A projection apparatus according to the present embodiment may be implemented according the apparatuses described as a single-panel projection apparatus 5010, that includes the optical system as depicted in the above described FIG. 1 and the control system (i.e., the control 5500) as that depicted in the above described FIG. 3A. The image projection apparatuses carry out a projection display of a color image by implementing a color sequential display method.

Specifically, the SLM controller 5530 of the control unit 5500 as that implemented by the projection apparatus 5010 generates a light source profile control signal 5800 based on the input digital video data 5700. The light source profile control signals are then inputted to a light source control unit 5560 through a sequencer 5540A.

The light source control unit 5560 controls the pulse width to project pulse emission from the red laser light source 5211, green laser light source 5212 and blue laser light source 5213 of a light source 5210 as flashing lights. The speed of flashing rates controlled by the light source profile control signal 5800 for switching between different colors of laser lights has a higher speed than the rate of state changes of the mirrors 4003 implemented in spatial light modulator 5100 for modulating the lights of different colors. Specifically, FIG. 11 shows the light source control unit 5560 controls the light source 5210 to turn on only for the period when a mirror is operated at a "stable ON" time shown as Tnet i.e., a second time length. The stable ON time is shorter than one ON operation period shown as the mirror ON period T0, i.e., a first time length, of the mirror 4003 as indicated in the mirror ON/OFF control pattern 8021.

Therefore, the mirror ON period T0 includes a rise time tr, a mirror stable ON time Tnet and a fall time tf. The mirror 4003 is unstable during the period of the rise time tr and fall time tf. The operation of the mirror during these unstable ON time periods generates a noise in reflection light 5602.

In order to minimize the adverse effects of the reflection during the unstable ON time periods, the present embodiment implements a light source control to turn on the light source 5210 only for a period of time of the mirror stable ON time Tnet. The light source is controlled by a light source pulse pattern 8010. With properly arranged light source control signals, the reflection light during the unstable ON periods including the rise time tr and fall time tf are eliminated because the light source is turned off during these periods. Therefore, accurate control of the intensity of the reflection light 5602 is achievable by controlling the projection periods the incident light 5601 from the light source incident to the spatial light modulator 5100.

Furthermore, the control method for controlling the mirror 4003 can also be applied to an apparatus implemented with an oscillation control. With oscillation control schemes, in addition the ON/OFF mirror states as depicted in FIG. 11, the mirror 4003 is controlled to oscillate between the ON state and OFF state. In an oscillation state of the mirror 4003, the light source pulse pattern 8010 is controlled to have variable pulse width. The light source pulse width T2 and a light source pulse width T3 are illustrated in FIG. 12. Therefore, compared with the light source that is kept on continuously, the intensity of the reflection light 5602 can be flexibly adjusted to achieve to more an accurate control the light intensity to coordinate with the oscillations of the mirrors.

FIG. 12 depicts the intensity of the reflection light 5602 that is controllable by controlling the length of time in turning on the light source when the mirror 4003 is operated at an ON state. The length of time when a mirror 4003 is operated at an ON state is denoted as a period T0 and the light intensity reflected from the mirror by keeping the light source 5210 continuously turned on is defined as one unit. In this embodiment, the light source 5210 is controlled to project lights as pulse emission. The light source control signal has a light source pulse width T2. The pulse width T2 is smaller than the pulse width T0 when the mirror is operated at an ON state. Furthermore, the center portion of FIG. 85 shows a mirror ON period T0 in which the mirror 4003 is in an oscillation state. The mirror is controlled to oscillate in accordance with a mirror oscillation control pattern 8022. Therefore, the intensity of the reflection light is controlled at ⅓ unit of the reflection light 5602 (as shown at the center of FIG. 12). Alternately, the light source 5210 is controlled to project pulse emission by controlling the light source with a light source pulse width T3 that is even smaller than the light source pulse width T2. Therefore, the intensity of the reflected light can be controlled at ¼ unit of the reflection light 5602 (as shown on the left end of FIG. 12).

With the reduced amount of light that is controllable, accurate control of the intensity of the reflection light 5602 (i.e., projection light 5603) down to an amount of about ⅓ unit and ¼ unit is achievable by controlling the pulse emission of the light source 5210 with different pulse width. The pulse width may be flexibly controlled in a period in which the change amount of the intensities of the reflection light 5602 reflected from the mirror 4003. Generally, the smallest amount of controllable light is achievable when the mirror 4003 of the spatial light modulator 5100 is operated in the oscillation state.

The following is a description of an exemplary embodiment for improving a degree of freedom in a color expression. Improvements of the color temperature and color balance are achievable for a projection image by controlling the pulse emission projection of the light source 5210 without changing the input digital video data 5700.

Step 1: the control signal inputted to SLM controller 5530 as control words, shown as one frame of input digital video data 5700, are divided into R, G and B pieces of data, noted as "RBG data" hereinafter.

Figure 13:
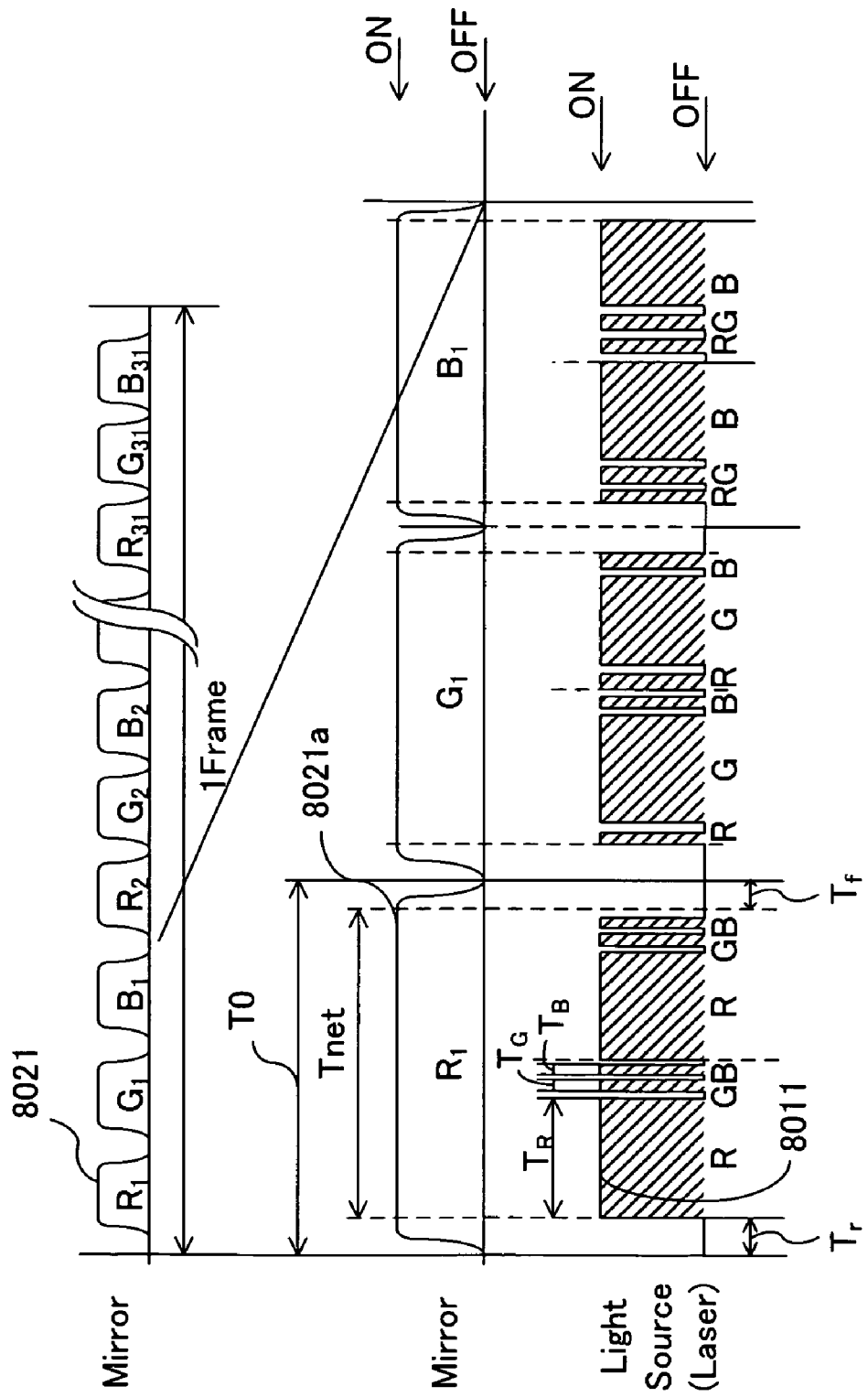
FIG. 13 is a chart exemplifying the operation of a projection apparatus according to a preferred embodiment of the present invention.

Step 2: the SLM controller 5530 further divides the RGB data into a plurality of pieces, e.g., 31 pieces when the input data is for a 5-bit gray scale; 127 pieces when the input data is for 7-bit gray scale. FIG. 13 further shows the mirror ON/OFF control patterns 8021.

Step 3: the SLM controller 5530 processes the RGB data now divided according to the R, G and B colors as sub-fields, rearranges the sub-fields in order of R, G and B, and generates a one-frame control signal (Data) (i.e., a mirror ON/OFF control pattern 8021a shown in FIG. 13) for controlling the spatial light modulator 5100.

Step 4: the SLM controller 5530 generates a control signal, i.e., a light source pulse pattern 8011 shown in FIG. 13, for the light source 5210. The light source pulse pattern 8011 inputted to the light source thus controls all the red laser light source 5211, green laser light source 5212 and blue laser light source 5213 to emit the respective colors R, G and B for the respective periods of individual sub-fields.

Furthermore, the SLM controller 5530 generates the light source pulse pattern 8011 to increase the emission time length of the light source of the main color for image display in each sub-field and decreases the emission time lengths of the light source of the remaining colors. As an example, for displaying the color red (R) of the light source pulse pattern 8011 of the sub-field as shown in FIG. 13, the light source pulse pattern 8011 is generated to shorten a green light source turn-on time TG (e.g., a pulse width) and a blue light source turn-on time TB (e.g., a pulse width) relative to a red light source turn-on time TR (e.g., a pulse width) that is the main color.

Furthermore, the exemplary embodiment provides controllable lengths of time for controlling the red light source turn-on time TR, green light source turn-on time TG and blue light source turn-on time TB. These controllable lengths of time are the respective emission time lengths of the light sources of the main color (i.e., red in this case) and other colors, are set within the mirror stable ON time Tnet. Other then the main color, the lengths of time are controlled to have a shorter length than the control unit time (i.e., the mirror ON period T0) of the mirror 4003 implemented in the spatial light modulator 5100. These subfields for each color are controlled to carry out a sequential emission of the respective colors R, G and B, or two colors from among R, G and B during the display period of sub-frames on an as required basis.

FIG. 13 shows the exemplary embodiment wherein the sequential emissions of R, G and B and the length of the red light source is twice the lengths of the turn-on time TR, green light source turn-on time TG and blue light source turn-on time TB during the mirror stable ON time Tnet.

Step 5: the SLM controller 5530 receives and applies the light source pulse pattern 8011 corresponding to the light source profile control signal 5800 to control the light source 5210 and also controls the spatial light modulator 5100 using the above described control signal (Data) of the spatial light modulator 5100.

According to the control processes, the projection apparatus 5010 controlled with a color sequential method using the input digital video data 5700 and implementing the projection optical system 5400 to project a color video image on a screen 5900 using the color sequential display method.

[Effect 1 of the Present Embodiment]

Specific benefits of the present embodiment are summarized and discussed below. Changing the ratio of the time lengths (i.e., the red light source turn-on time TR, green light source turn-on time TG and blue light source turn-on time TB) of the respective color lights, i.e., R, G and B, emitted during the display period of sub-frames can achieve the desired color balance of the color video image by using the projection light 5603 projected on the screen 5900 by way of the projection optical system 5400. The color balance is achieved without changing a control signal (Data) for the spatial light modulator 5100.

Figure 14:
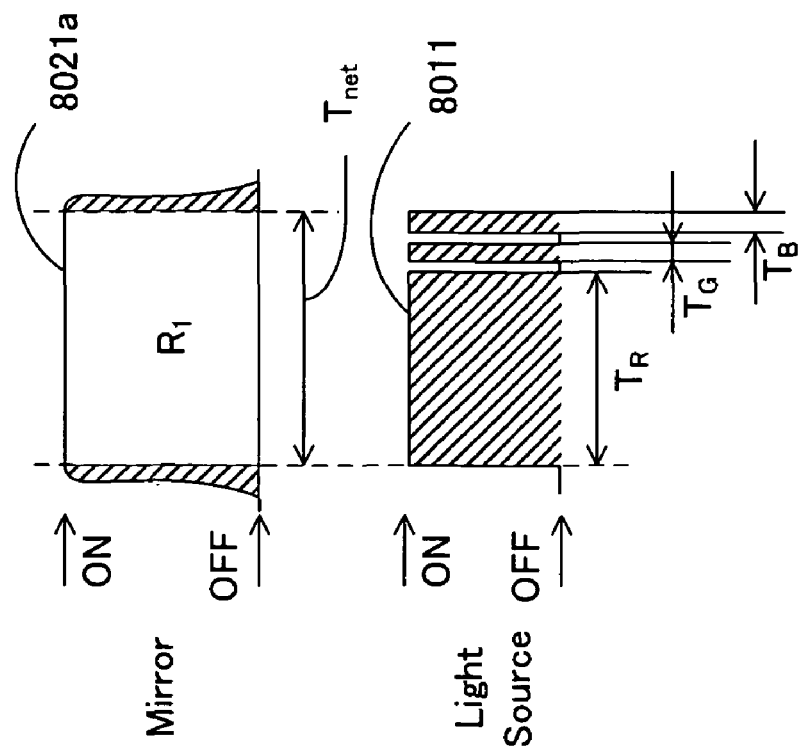
FIG. 14 is a chart showing the principle of controlling a color balance in a projection apparatus according to a preferred embodiment of the present invention.

FIG. 14 is a timing diagram for illustrating an exemplary length of time TR for turning on the red light source as the main color for the period of displaying sub-frames relative to the green light source turn-on time TG and blue light source turn-on time TB. For simplicity, FIG. 14 depicts the sequential RGB turning on times in one cycle of emission during the mirror stable ON time Tnet. According to FIG. 14, the length of the turning-on time during the mirror stable ON time Tnet for each color, i.e., the red light source turn-on time TR, green light source turn-on time TG and blue light source turn-on time TB are set at a constant ratio.

Alternatively, each of the red light source turn-on time TR, green light source turn-on time TG and blue light source turn-on time TB can be set at respectively a predetermined time length.

Furthermore, the red light source turn-on time TR, green light source turn-on time TG and blue light source turn-on time TB can respectively be controlled as flexibly adjustable time lengths. Or, by changing the ratios appropriately among the red light source turn-on time TR, green light source turn-on time TG and blue light source turn-on time TB can further adjust the color balance. Specifically, the changing the ratios among the red light source turn-on time TR, green light source turn-on time TG and blue light source turn-on time TB, is equivalent to changing the color coordinates on a chromaticity diagram (not shown in a drawing herein). The image projection apparatus enables the control system to control the color temperature of a color video image displayed on the screen 5900 using the projected light 5603 by appropriately changing the ratio among the red light source turn-on time TR, green light source turn-on time TG and blue light source turn-on time TB.

[Effect 2 of the Present Embodiment]

It is possible to enhance brightness by controlling the green light source turn-on time TG and blue light source turn-on time TB to overlap with the time period of the red light source turn-on time TR during the display period of one main color (i.e., red in this case) according to the light source pulse pattern 8011 shown in the above described FIG. 13.

Figure 15:
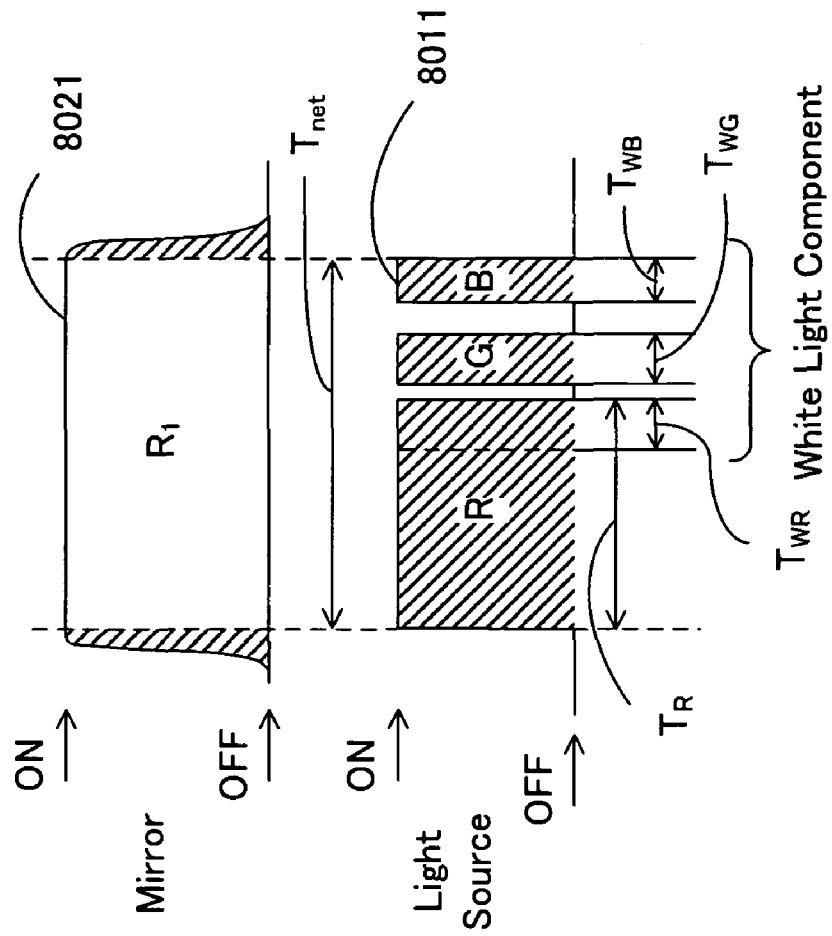
FIG. 15 is a chart showing the principle of controlling a color balance in the ON/OFF control of a mirror in a projection apparatus according to a preferred embodiment of the present invention.

FIG. 15 is a timing diagram for illustrating the principle of improving the brightness. For simplicity, FIG. 15 depicts a display of one cycle of R, G and B during a mirror stable ON time Tnet similar to the above-described FIG. 14.

Specifically, the green light source turn-on time TG (i.e., white light/green component TWG) and blue light source turn-on time TB (i.e., white light/blue component TWB) are controlled to overlap with the time period of the main red light source turn-on time TR during the mirror stable ON time Tnet. The colors are synthesized with the white light/red component TWR contained in the red light source turn-on time TR, thereby generating a white component to proportionately enhance the brightness of the projection image.

FIG. 15 thus illustrates an enhancement in the brightness by increasing a white component in the case of the ON/OFF control for the mirror 4003. Enhancements of the brightness may also be achieved by combining the ON/OFF control of the mirror 4003 with an oscillation control thereof as shown in FIG. 16.

Figure 16:
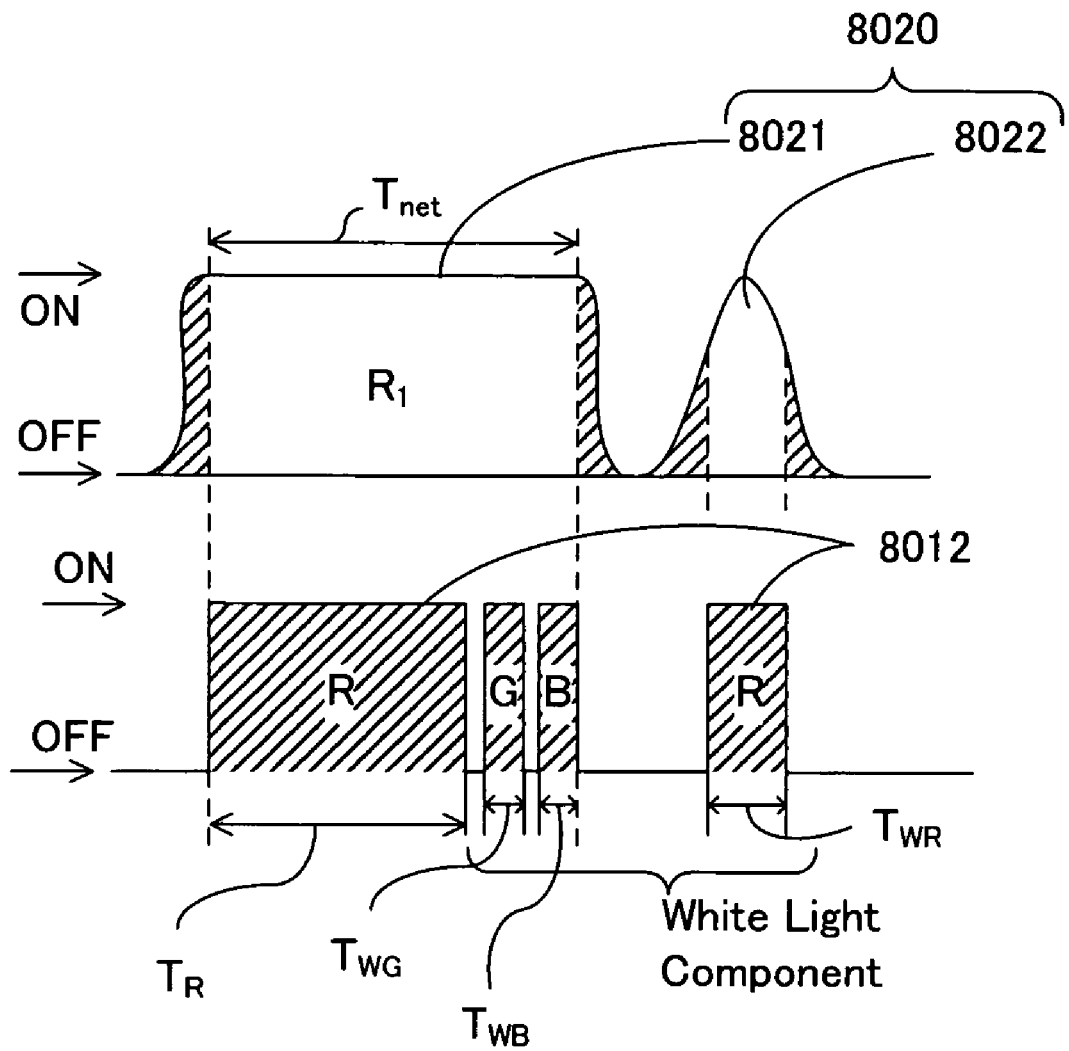
FIG. 16 is a chart showing the principle of controlling a color balance in the case of combining the ON/OFF control of a mirror with the oscillation control thereof in a projection apparatus according to a preferred embodiment of the present invention.

Specifically, FIG. 16 depicts a light source pulse pattern 8012 to increase a white light component by combining other white light/green component TWG and white light/blue component TWB. This is achieved by controlling the mirror 4003 for combining the ON/OFF control with an oscillation control in accordance with a mirror control signal profile 8020 that includes a mirror ON/OFF control pattern 8021 and a mirror oscillation control pattern 8022.

Specifically, FIG. 16 illustrates the light source pulse pattern 8012 for controlling the white light/green component TWG and white light/blue component TWB to overlap with the main red light source turn-on time TR during the ON/OFF control period corresponding with the mirror ON/OFF control pattern 8021. The white light/red component TWR has a light intensity balances with the two color components simultaneously projected during the period of the mirror oscillation control pattern 8022.

Figure 17:
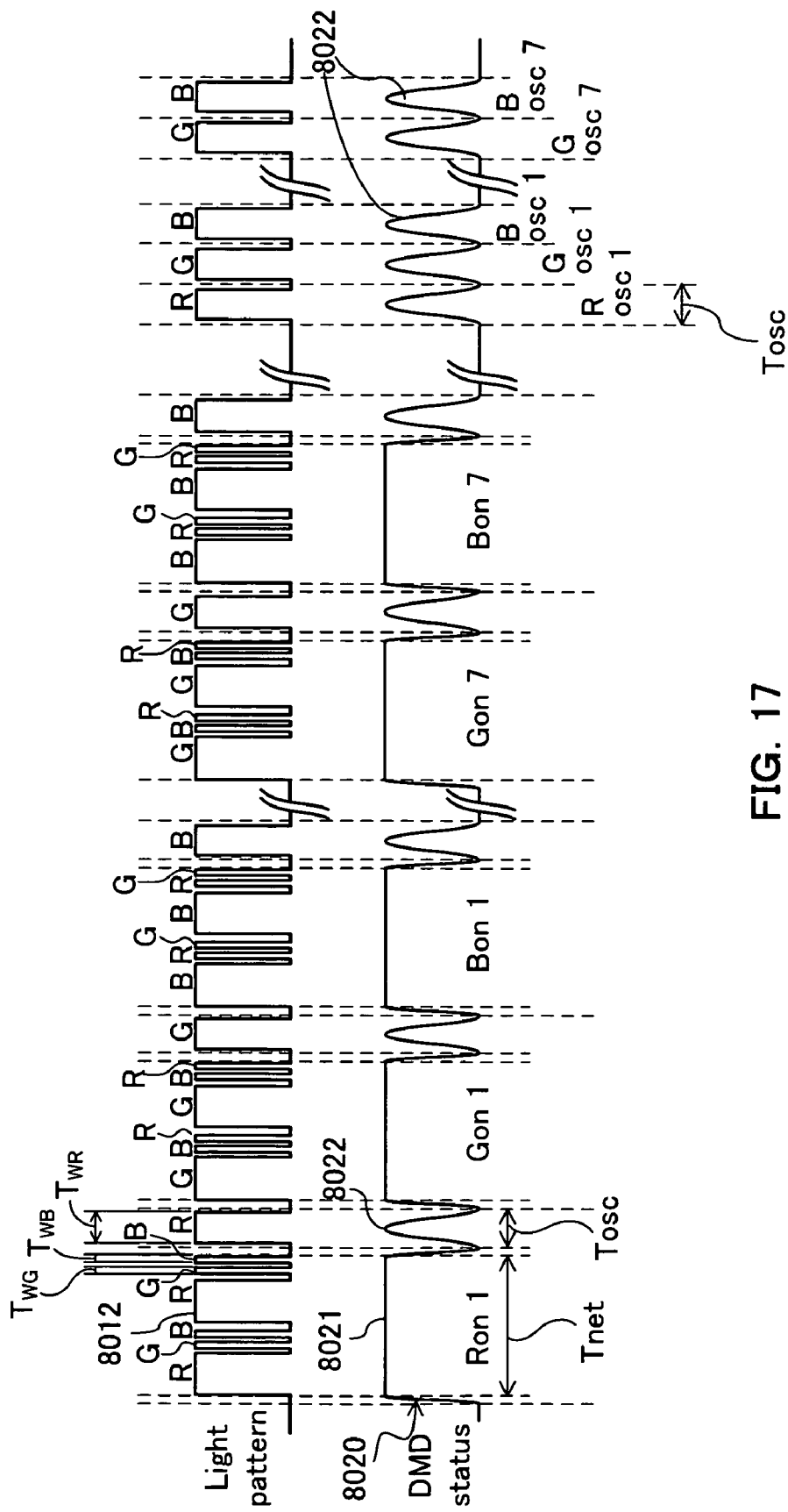
FIG. 17 is a chart exemplifying the operation in the case of combining the ON/OFF control of a mirror with the oscillation control thereof in a projection apparatus according to a preferred embodiment of the present invention.

FIG. 17 depicts the control process of a 6-bit gray scale display carried out with a 3-bit ON control and a 3-bit oscillation control in order to display digital video image data (i.e., the input digital video data 5700) in 6-bit gray scale for each color.

There are three bit for each color for controlling the mirror 4003 to operate at an ON state in the seven ON periods during the display period of one frame of a display video image according to the mirror ON/OFF control pattern 8021. Specifically, the mirror projects in each ON period a brightness equivalent to the LSB of the upper 3-bit of respective colors according to the input data during the respective ON period. In the ON periods for each color, the mirror 4003 is repeatedly operated at an ON state multiple times (i.e., two times in this configuration) of the pulse emission of the red laser light source 5211, green laser light source 5212 and blue laser light source 5213 of the respective colors R, G and B for a shorter time length than the ON period. The ratio of the pulse emission of the respective colors are set to maximize the ratio of the main color displayed through reflecting from a mirror 4003 that is controlled to synchronously operate at an ON state. Following each ON time for different colors, the mirror oscillation control pattern 8022 controls the mirror to operate in one oscillation state and the pulse emission (i.e., white light/red component TWR) of the main color (i.e., red (R) is projected at the beginning of the frame, as shown in FIG. 17, with the main color displayed during the previous ON time. The main color display time during last cycle has a shorter time (i.e., a second time length), that shorter than the oscillation time length (i.e., a mirror oscillation period Tosc; first time length).

This control process causes a white component projected as the sum of the pulse emission (e.g., white light/red component TWR) corresponding to the oscillation state and the plus emissions (i.e., the white light/green component TWG and white light/blue component TWB) of the two lights (i.e., G and B). The projection light is brighter than the main color emitted during the previous ON time, thereby increasing the brightness of the video image. After the mirror 4003 is controlled to operate at an ON state, the mirror is controlled to operate at an oscillation state according to the 3-bit for the respective colors, that is, 7 times of oscillation, during the display period of one frame.

Specifically, the brightness is therefore equivalent to the LSB of the lower 3-bit of each color of the input data in each oscillation period. In each oscillation control, the pulse projections of a laser light source of either color of R, G and B project to the mirror 4003 during length of time that is shorter than each oscillation time length (i.e., the mirror oscillation period Tosc).

The control process described above applies a 6-bit gray scale display control for each color during the display period of one frame.

Figure 18:
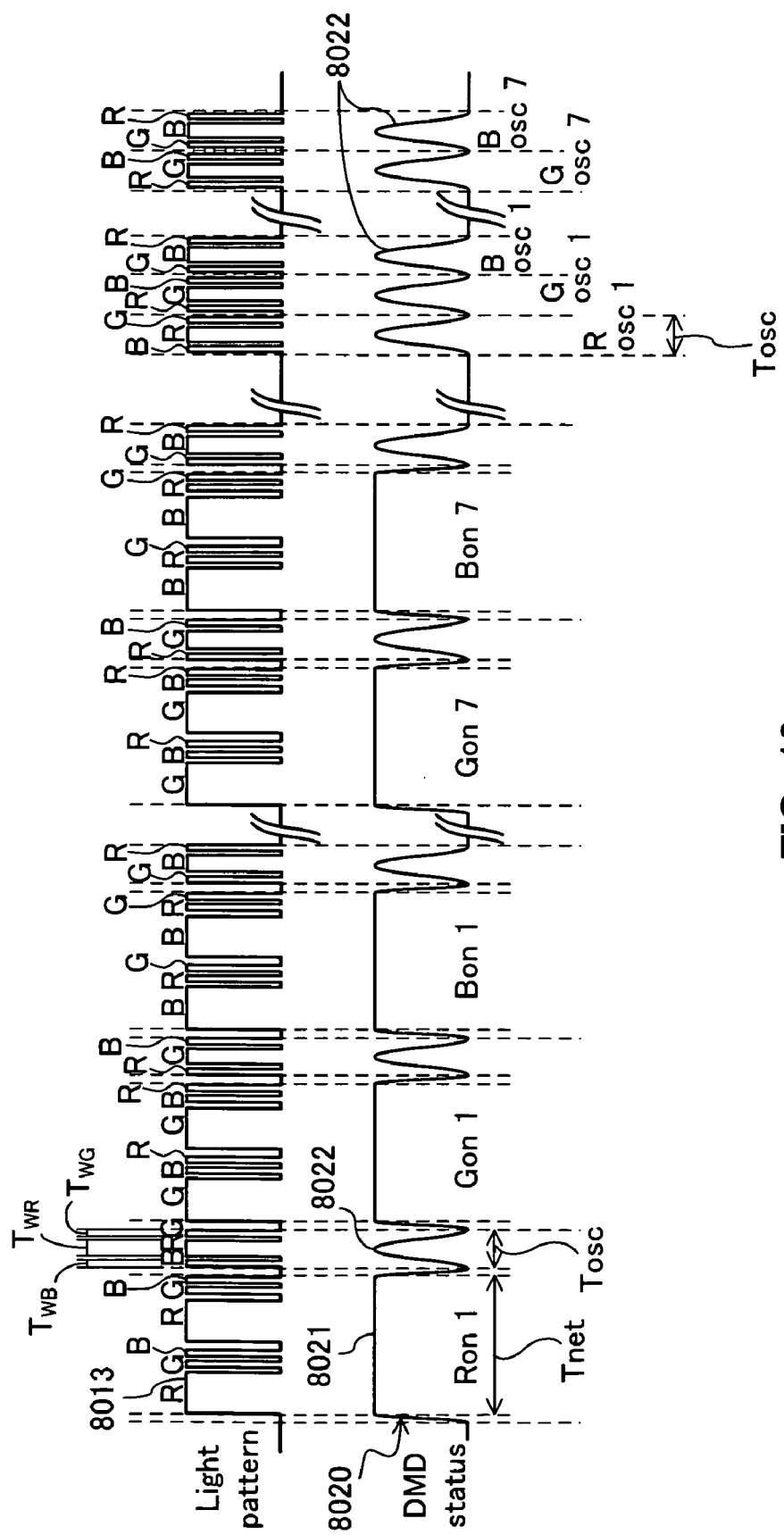
FIG. 18 is a chart exemplifying the operation in the case of combining the ON/OFF control of a mirror with the oscillation control thereof in a projection apparatus according to a preferred embodiment of the present invention.

Meanwhile, FIG. 18 is a timing diagram for showing the light source pulse pattern 8012 and mirror control signal profile 8020 for carrying out a 6-bit gray scale display control with a 3-bit ON control and a 3-bit oscillation control in order to display the input digital video data 5700 in 6-bit gray scale for each color. Specifically, the spatial light modulator 5100 applies the mirror ON/OFF control pattern 8021 for carrying out the mirror ON time control includes 3-bit ON period for each color. Therefore, during the display period of one frame of a display video image there are 7 ON times for each color. Specifically, with such a control process, the brightness is equivalent to the LSB of the higher 3-bit of each color of the input digital video data 5700 inputted during each ON period.

During each ON period the pulse projection from the red 5211, green 5212 and blue 5231 laser light source of the respective colors R, G and B projects light to the mirror 4003 a plurality of times according to the mirror ON/OFF control pattern 8021, i.e., two times in the example of FIG. 18. The length of ON time has a shorter time length (i.e., the mirror stable ON time Tnet) than the ON period of the mirror. The ratio of the pulse width for projecting different colors is set to maximize the pulse width of the main color of display by controlling a mirror 4003 operated at an ON state.

Subsequent to the ON time corresponding to the mirror ON/OFF control pattern 8021 for each color, the mirror is controlled to operate at one oscillation state according to the mirror oscillation control pattern 8022. The pulse width of the main color (i.e., R in the example of the head side of FIG. 91) displayed in the previous ON time is set with a shorter time length than the oscillation time length (i.e., the mirror oscillation period Tosc).

The color balance of the display video image is adjusted by the ratio of the pulse width for each color (i.e., the white light/red component TWR) corresponds to the oscillation state. The color balance is further adjusted by taking into account the pulse width of two colors other than the main color emitted during the previous ON time, i.e., G and B, or the white light/green component TWG and white light/blue component TWB) of two colors. Subsequently the mirror is controlled to operate at an ON state, the mirror 4004 is controlled to operate at an oscillation state according to a 3-bit oscillation control signal for the respective colors, that is, 7 times of oscillation, during the display period of one frame. Therefore, a brightness equivalent to the brightness according to the LSB of the lower 3-bit of each color of the input data is achieved during the respective oscillation periods.

In the respective periods when the mirror is operated in the oscillation state, the mirror 4003 is irradiated by repeating a plurality of times (i.e., one time in this case) of pulse emission (i.e., the white light/blue component TWB, white light/red component TWR and white light/green component TWG) of laser light sources of three colors R, G and B. The pulse emission for each color is projected in a shorter time length than the respective oscillation time lengths.

The ratio of the pulse emission of the respective colors is set to maximize the main color light projection by controlling a mirror 4003 operated in an oscillation state. The pulse emission of the mirror is controlled to be at a timing coinciding with the center of the oscillation state. The color balance of the display video image is adjusted by adjusting the ratio of the reflection light intensities of the light of the colors R, G and B and adjusting the intensities reflected during the oscillation period. The control processes as described above allows the flexibility of adjusting the color balance of a displayed video image in addition to a 6-bit gray scale display for each color during the display period of one frame.

<Embodiment 2>

As described above, an image projection apparatus employs a spatial light modulator 5100 implemented as a mirror device. According to the present embodiment, the mirror device is configured to carry out a linear gray scale display that is different from a conventional display apparatus, such as a cathode ray tube (CRT) display.

Figure 19:
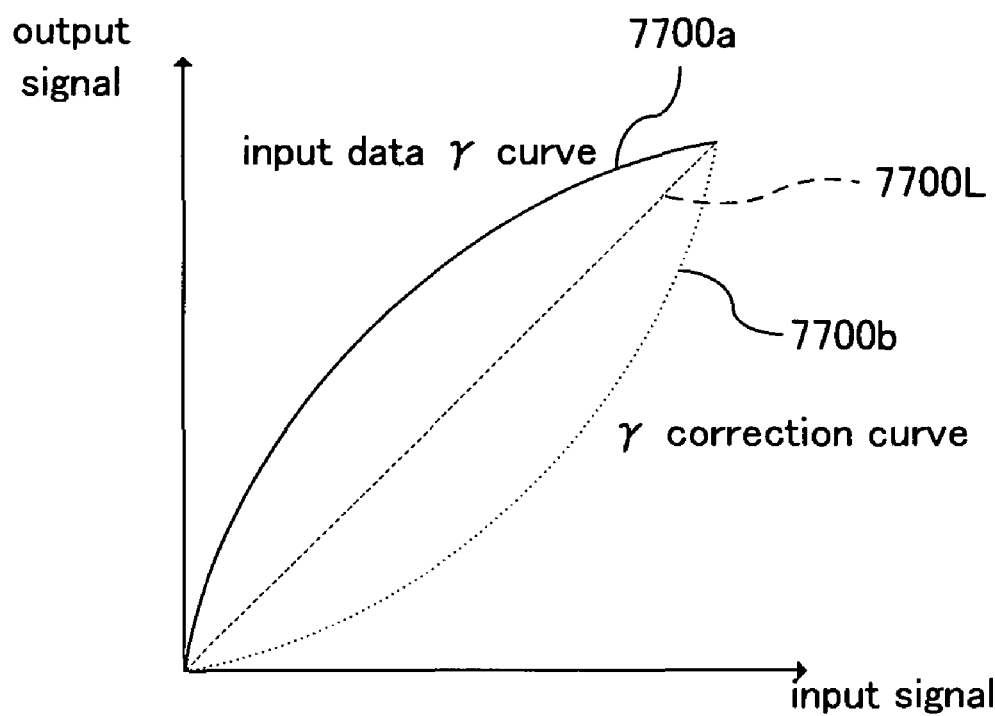
FIG. 19 is a chart describing the principle of a gamma ($\gamma$) correction for video image data.

Therefore, FIG. 19 illustrates a gamma correction; an input data γ curve 7700a is applied to a piece of input digital video data 5700 at the transmission source (i.e., where the imaging is carried out). Assuming a display on a CRT, as shown in FIG. 19, a projection apparatus comprising a display device other than a CRT is required to restore the characteristic of a gray scale display to the original state (e.g., a conversion line 7700L for performing a linear conversion of the input data signal and brightness signal). This is done by means of a correction such as a gamma correction curve 7700b, or by a variety of gamma corrections in accordance with the respective characteristics of projection apparatuses 5010, 5020, 5030 and 5040.

In such a case, a mathematical operation related to the input digital video data 5700, as it is performed in a conventional display apparatus, causes the circuit scale of the control unit 5500 to increase, leading to a higher production cost.

Figure 20:
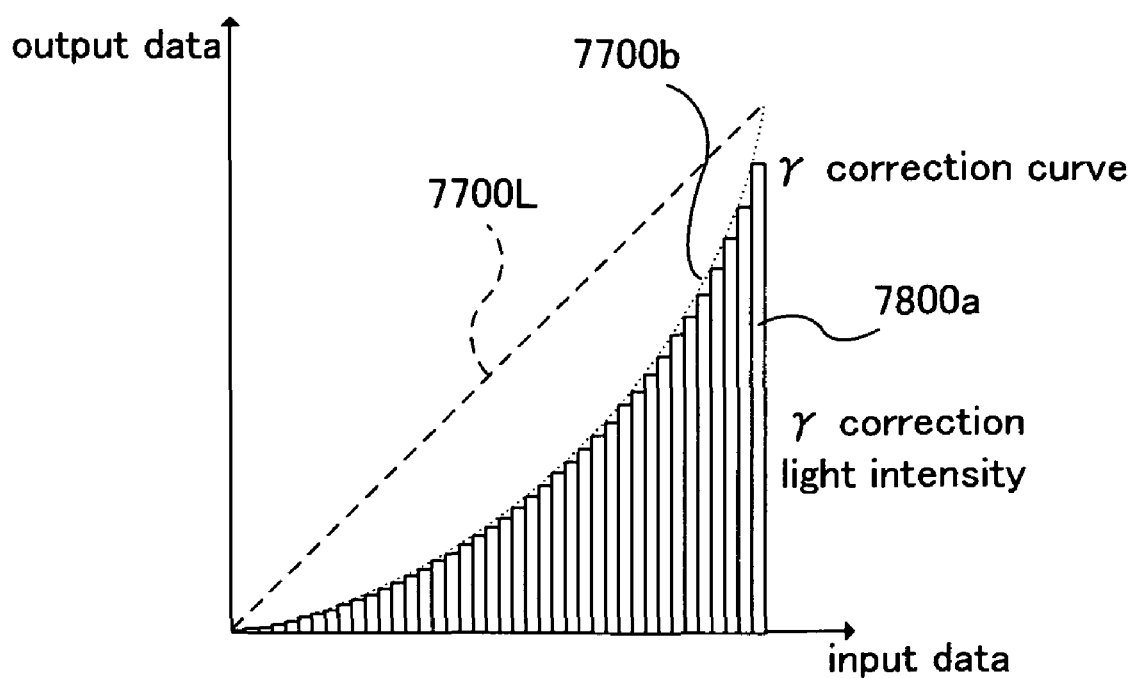
FIG. 20 is a chart showing the principle of a gamma correction by controlling the emission light intensity of a light source carried out in a projection apparatus according to the embodiment of the present invention.

The present embodiment is configured so that the above described video image analysis unit 5550 changes the emission pattern of the illumination light, emitted from the adjustable light source 5210, to the profile as indicated by a gamma correction light intensity variation 7800a so as to correspond to the above described gamma correction curve 7700b, as illustrated in FIG. 20. Thereby, a linear gray scale display, as indicated by the conversion line 7700L, is attained by negating the influence of the input data γ curve 7700a performed at the transmission source, without requiring a mathematical operation of the input digital video data 5700.

Note that this configuration makes it possible not only to restore the linearity by negating the influence of the input data y curve 7700*a*, but also to change, intentionally and nonlinearly, the emission intensities of the adjustable light source 5210 within one frame, as described below. This enables various and highly precise gray scale displays, exceeding the original gray scale capability of the spatial light modulator 5100 adjustable light source.

For example, a video image output (i.e., input digital video data 5700) contains various scenes, such as a dark scene, a bright scene, a generally bluish scene, and a generally reddish scene, such as sunset. The projection apparatus according to the present embodiment is configured to control the gray scale of the emission output of the adjustable light source 5210 optimally for each scene (with actual control carried out in units of frame), thereby making it possible to attain higher quality video images than with the conventional method.

When a gamma correction for input digital video data 5700 (i.e., an input data γ curve 7700*a*) is implemented by means of a temporal change in emission intensities of the adjustable light source 5210 as described above, a precise emission control of the adjustable light source 5210 is difficult if an ON/OFF control of the mirror 5112 is carried out through a pulse width modulation (PWM,) which uses binary data 7704 included in the input digital video data 5700 adjustable light source.

Figure 21:
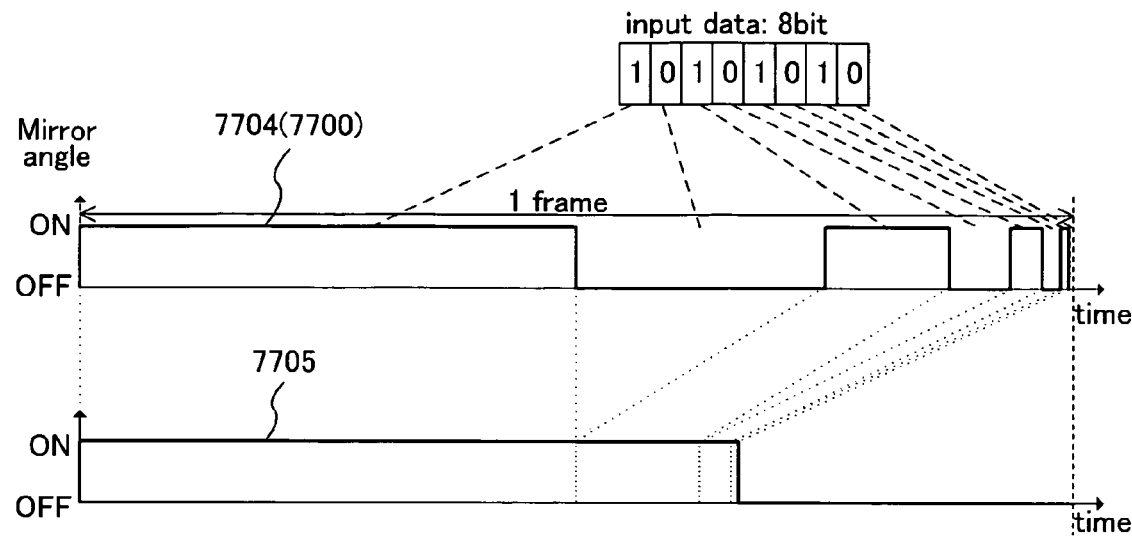
FIG. 21 is a chart describing an example of converting binary data into non-binary data carried out in a projection apparatus according to the embodiment of the present invention.
Figure 22:
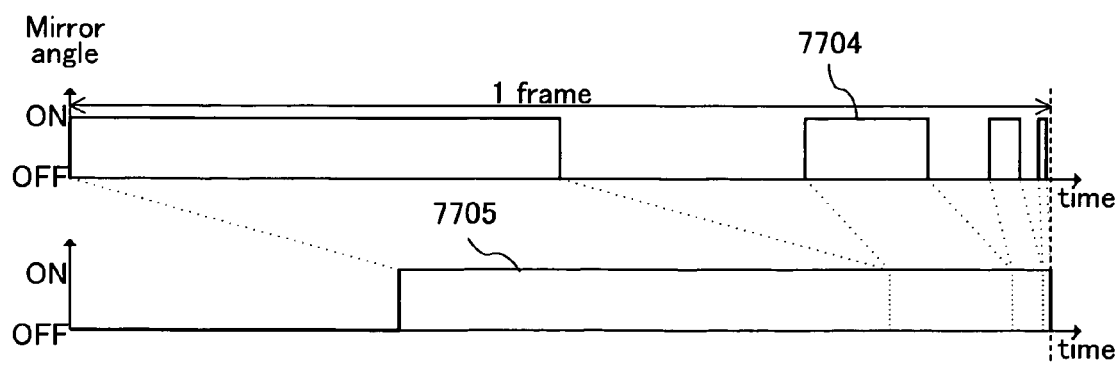
FIG. 22 is a chart describing an example of converting binary data into non-binary data carried out in a projection apparatus according to the embodiment of the present invention.

Thus, the SLM controller 5530, according to the present embodiment, is configured to carry out an ON/OFF control for the mirror 5112 using non-binary data 7705 obtained by converting the binary data 7704, as shown in FIGS. 21 and 22.

FIG. 21 illustrates 1.) The generation of non-binary data 7705 (which is a bit string with each digit being of equal weight) from the binary data 7704 comprising, for example, 8-bit "10101010" and 2.) The mirror 5112 is turned ON the only for a period when the bit string continues.

Note that FIG. 21 illustrates 1.) The conversion of non-binary data 7705 so that the bit string is packed forward within the display period of one frame, and 2.) The turning ON of the mirror 5112 for a predetermined period in accordance with the bit string number starting from the beginning of a frame display period.

Furthermore, FIG. 22 illustrates the conversion of binary data 7704 (shown in FIG. 21) into a bit string of non-binary data 7705 with the digits packed backward. In this case, the mirror 5112 is turned ON only in the period of time corresponding to the bit string number starting from the middle of a frame display period until the end.

When the ON/OFF of the mirror 5112 is controlled by the non-binary data 7705 as described above, the ON period of the mirror 5112 becomes continuous, and therefore, control of the emission intensity of the adjustable light source 5210 synchronously with the aforementioned ON period be more easily achieved.

Figure 23:
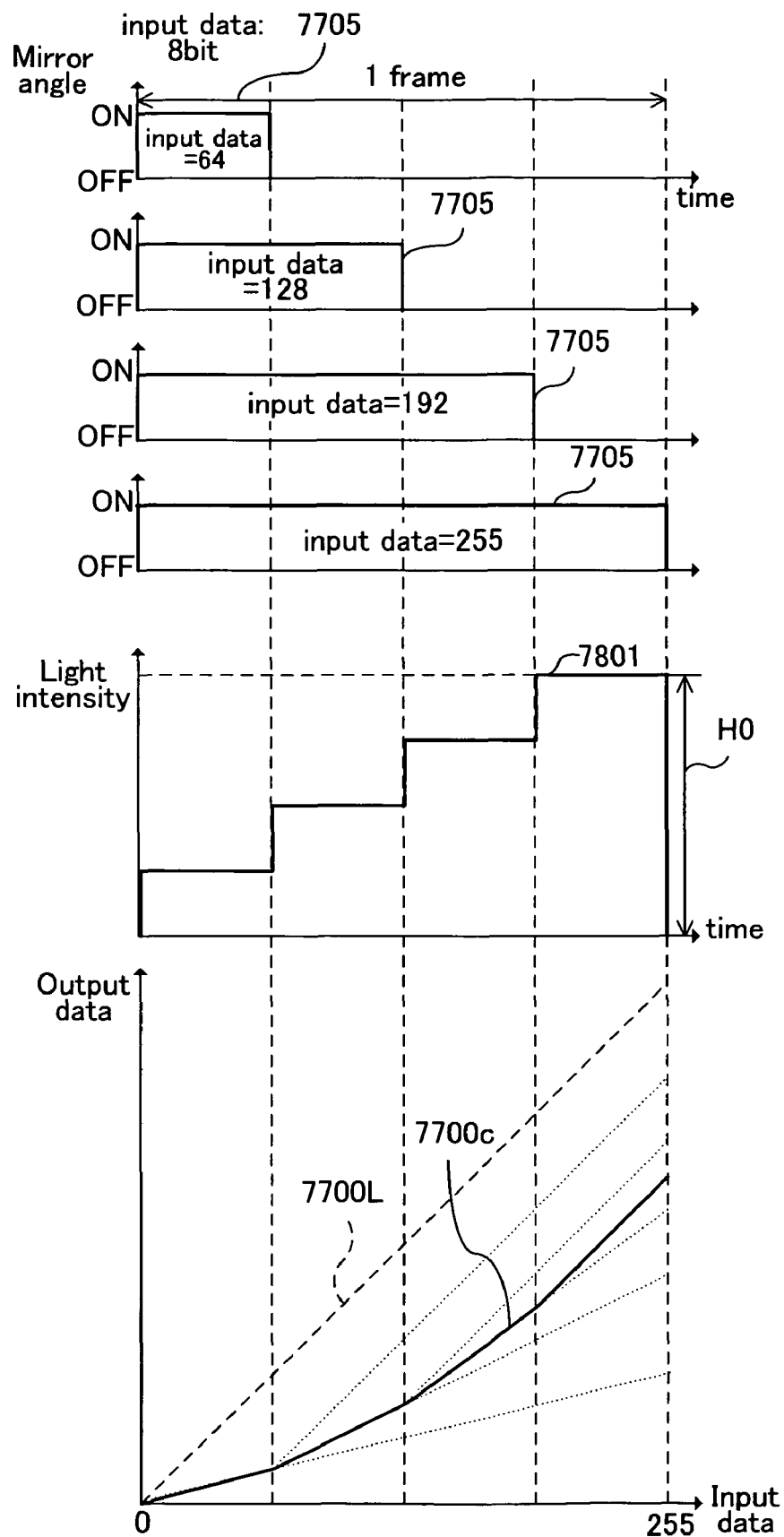
FIG. 23 is a chart showing an example of carrying out a gamma correction in the brightness input of 8-bit non-binary data in four stages in a projection apparatus according to the embodiment of the present invention.

FIG. 23 illustrates 1.) The brightness input of 8-bit non-binary data 7705 into, for example, four steps, i.e., 64, 128, 192 and 255, as shown in the upper rows of FIG. 23, and 2.) Obtaining a gamma correction curve 7700*c*, as shown in the lower row of the drawing, through a four-step control of the output intensity of the adjustable light source 5210 in response to the each of the aforementioned levels, as indicated by a light source pulse pattern 7801 shown in the middle row of the drawing.

For simplicity, while FIG. 23 illustrates the control process in four steps, a further minute grouping of the non-binary data 7705 makes it possible to obtain a smoother curve than the gamma correction curve 7700*c*.

Note that the example of FIG. 23 shows that the correction amount of the gamma correction curve 7700*c* is less bright when compared with the conversion line 7700L. Accordingly, the emission pattern of the adjustable light source 5210 may be controlled so as to move a gamma correction curve 7700*d* closer to the above described conversion line 7700L (as indicated in the bottom part of FIG. 24). This is done by increasing the emission intensity of the light source pulse, from the emission light intensity H0 to the emission light intensity H1, toward the tail end of the display period of one frame, as indicated by a light source pulse pattern 7802, as shown in FIG. 24.

Figure 24:
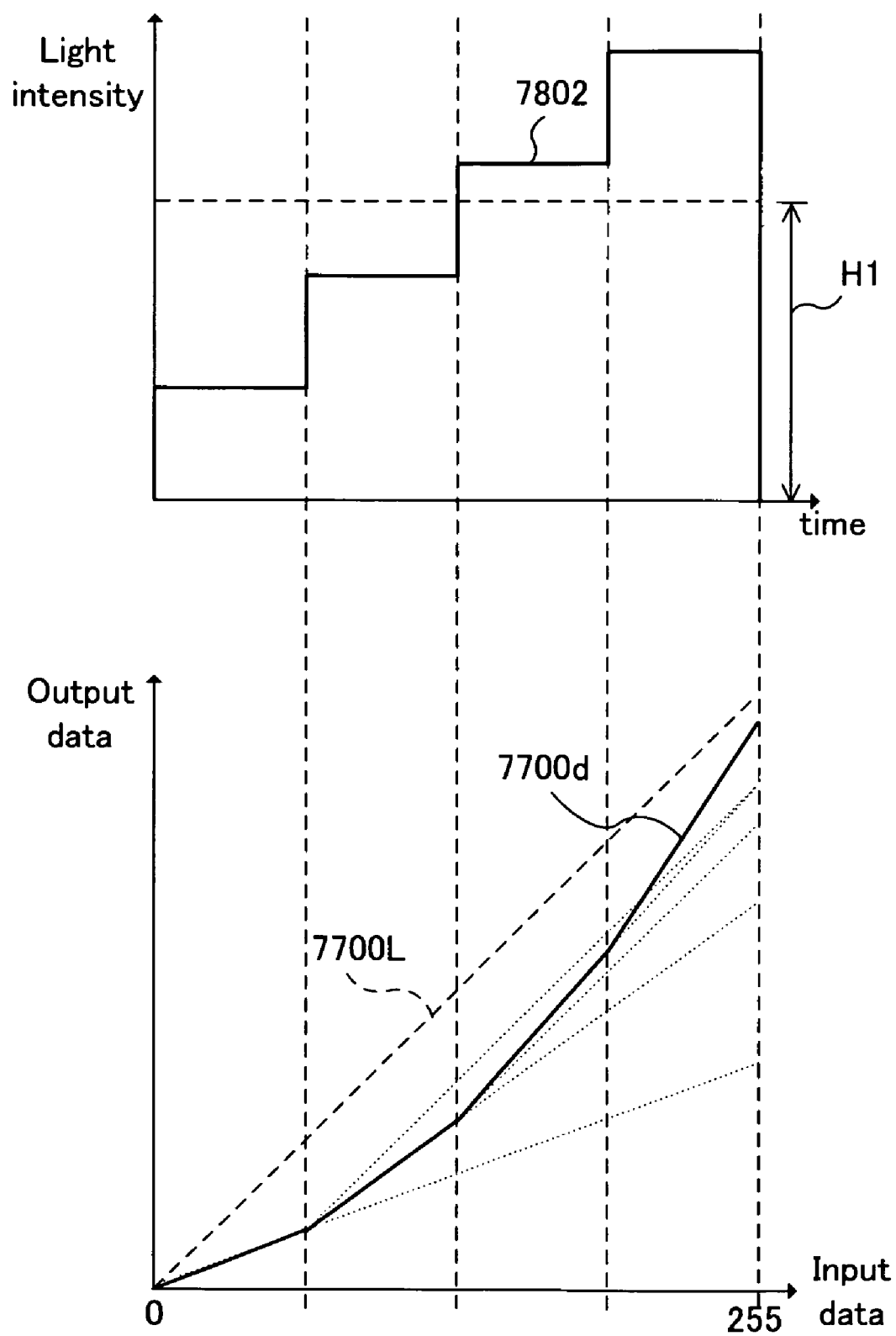
FIG. 24 is a chart showing an exemplary modification of carrying out a gamma correction in the brightness input of 8-bit non-binary data in four stages in a projection apparatus according to the embodiment of the present invention.

FIGS. 23 and 24 illustrate a gamma correction by changing the emission intensity while maintaining the adjustable light source 5210 so that it continuously emits light, as indicated by the light source pulse patterns 7801 and 7802. The control may also be performed by means of an intermittent pulse emission.

Figure 25A:
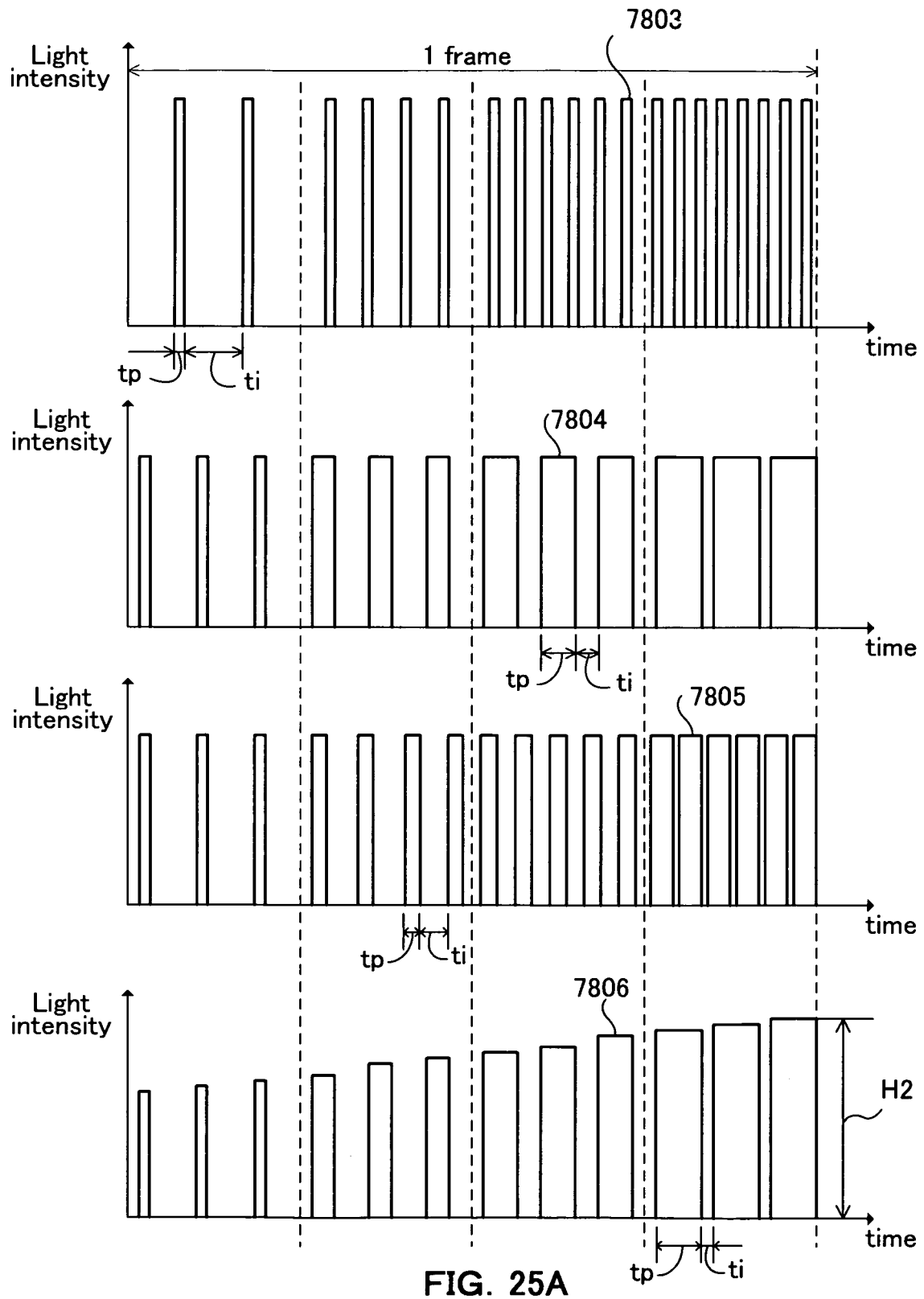
FIG. 25A is a chart exemplifying a gamma correction by means of intermittent pulse emission in a projection apparatus according to the embodiment of the present invention.

FIG. 25A exemplifies a control by means of the aforementioned intermittent pulse emission. A light source pulse pattern 7803 illustrated in FIG. 25A generates emission pulses having an emission pulse width tp. This is done intermittently in intervals of emission pulse intervals ti, and the number of emission pulses per unit time is increased by gradually decreasing the emission pulse interval ti between the beginning and end of the display period of one frame, thereby achieving an effect similar to that of the continuous light source pulse patterns 7801 and 7802 described above.

Furthermore, the light source pulse pattern 7804 exemplifies the gradual increase of the emission pulse width tp between the beginning and end of the display period of one frame.

The light source pulse pattern 7805 exemplifies the gradual decrease of the emission pulse intervals ti and also the gradual increase of the emission pulse width tp between the beginning and end of the display period of one frame.

Furthermore, the light source pulse pattern 7806 exemplifies the gradual increase of both the emission pulse width tp and emission light intensity H2 between the beginning and end of the display period of one frame.

As in the case of the light source pulse patterns 7803, 7804, 7805 and 7806, illustrated in FIG. 25A, the peak of the drive frequency of the adjustable light source 5210 is distributed by changing the emission pulse widths tp and emission light intensity H2 within one frame, thereby suppressing the electromagnetic noise from the adjustable light source 5210.

Figure 25B:
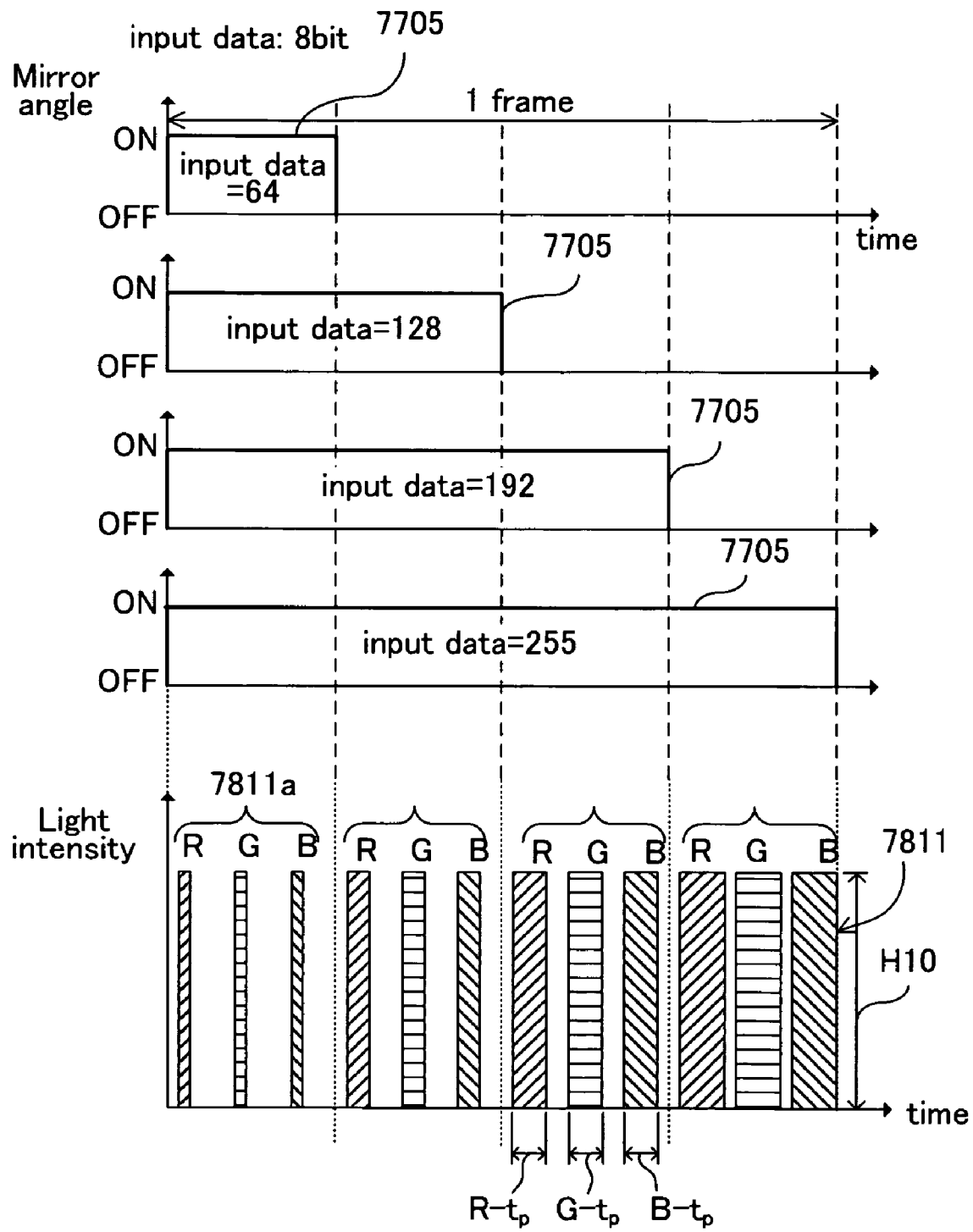
FIG. 25B is a chart describing an exemplary modification of the modulation of pulse emission of a adjustable light source comprised in a projection apparatus according to the embodiment of the present invention.

The following is a description of an exemplary modification of a modulation of pulse emission of the adjustable light source 5210 with reference to FIGS. 25B, 25C, 25D and 25E. The exemplary modification shows the operations of the modulation states of the pulse emission of the adjustable light source 5210 in such a way that they differ depending on the magnitude of the brightness data of each pixel, i.e., the lengths of the ON period of the mirror 5112 within one frame. As illustrated in FIG. 25B, this modification uses a pulse emission pattern 7811 that includes a repeated array of emission pulse groups 7811*a* of individual emission pulses, i.e., emission pulse widths R-tp, G-tp and B-tp of R (red light), G (green light) and B (blue light), that are emitted from the adjustable light source 5210 within one frame.

FIG. 25B shows the emission pulses with equally set each of the emission pulse widths R-tp, G-tp and B-tp, of the respective emission pulses R, G and B, within a plurality of emission pulse groups 7811*a* constituting the pulse emission pattern 7811. The light source is also controlled to gradually increase the pulse width from the beginning to the end of one frame for each of the individual emission pulse group 7811*a*.

Figure 25C:
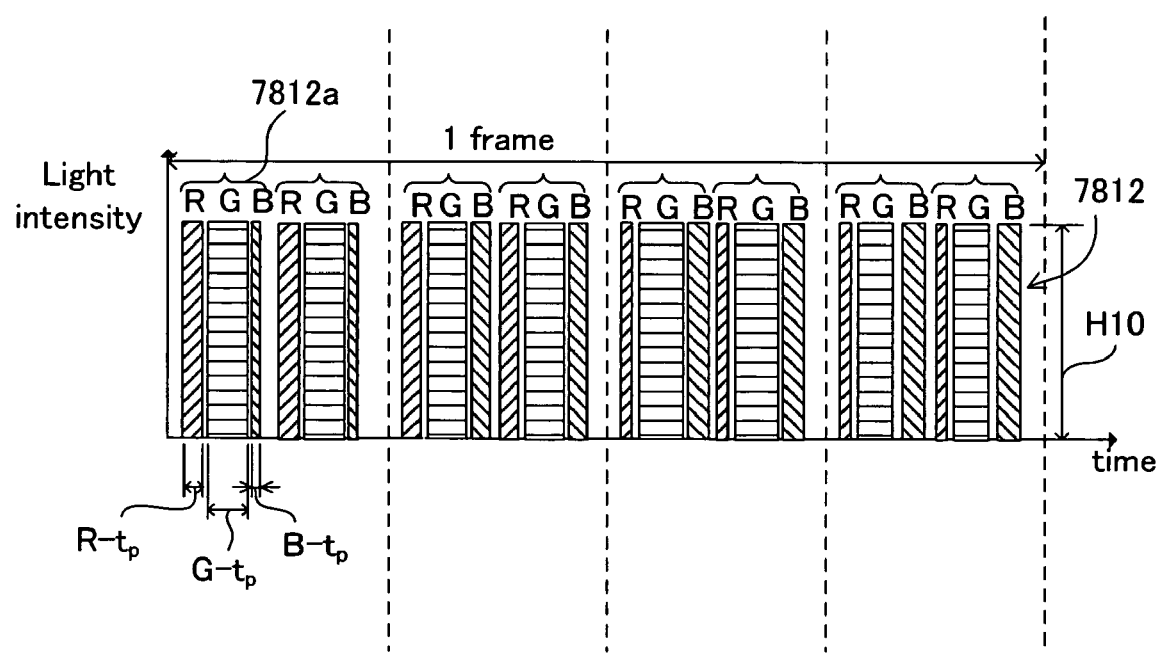
FIG. 25C is a chart describing an exemplary modification of the modulation of pulse emission of a adjustable light source comprised in a projection apparatus according to the embodiment of the present invention.

Furthermore, the emission light intensity H10 is constant within one frame in each of the emission pulse groups 7811a. The pulse emission pattern 7812 illustrated in FIG. 25C shows the case of setting the emission light intensity H10 constant and setting the emission pulse widths R-tp, G-tp and B-tp at different values within each of the emission pulse groups 7812a, thereby changing the light intensity ratios of R, G and B, specifically, changing the color balance.

Figure 25D:
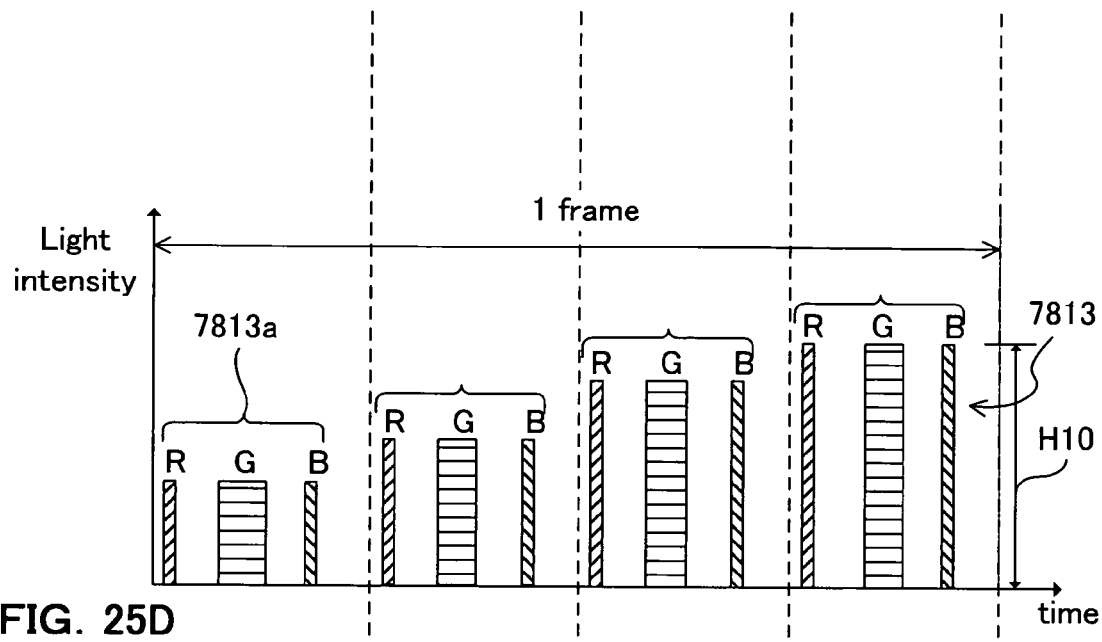
FIG. 25D is a chart describing an exemplary modification of the modulation of pulse emission of a adjustable light source comprised in a projection apparatus according to the embodiment of the present invention.
Figure 25E:
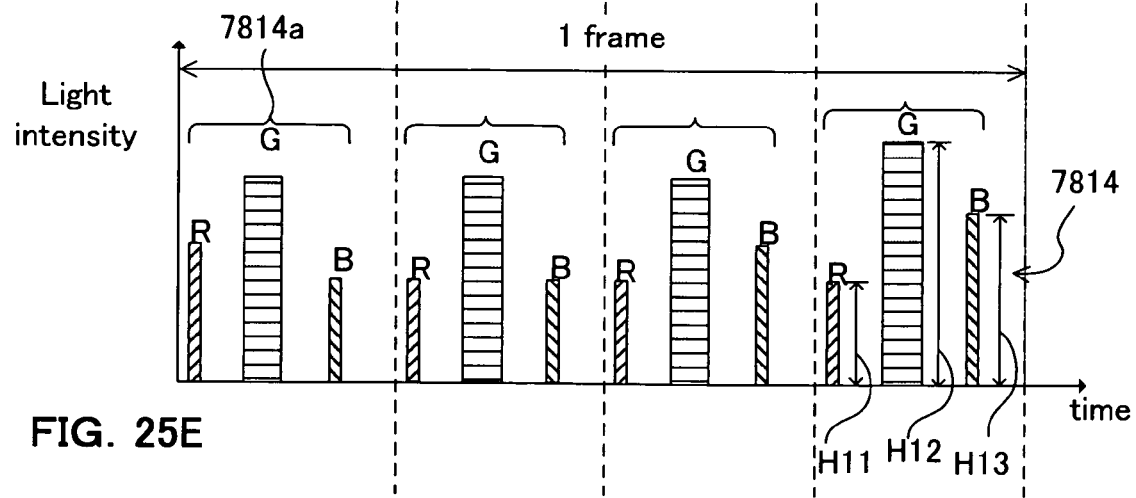
FIG. 25E is a chart describing an exemplary modification of the modulation of pulse emission of a adjustable light source comprised in a projection apparatus according to the embodiment of the present invention.

Furthermore, the pulse emission pattern 7813 illustrated in FIG. 25D shows the case of setting the ratio of the emission pulse widths R-tp, G-tp and B-tp constant in each of the emission pulse groups 7813a within one frame, and gradually increasing the emission light intensity H10 starting from the beginning to the end of a frame. The pulse emission pattern 7814 illustrated in FIG. 25E changes so that the emission light intensities H11, H12 and H14 of the respective pulse emission of R, G and B are differ within each of the emission pulse groups 7814a.

The time sequences of the pulsed emissions described in FIGS. 25B through 25E each differentiates the ratios of R, G and B in accordance with a period in which the mirror 5112 is in the ON state within one frame, that is, in accordance with the magnitude of the non-binary data 7705 that is brightness data. Thus, the color balance is controlled in accordance with the brightness of each pixel. This means that when a discretionary pixel is made to be, for example, red, a control for changing the tone of the red in accordance with the brightness of the present pixel is attained.

Therefore, the light source can freely control a tone in such a manner so that, for example, black (i.e., the minimum brightness) will be displayed blacker; white (i.e., the maximum brightness) will be changed to, for example, a bluish color. Meanwhile, the spectral luminous efficiency of the human eye is known to differ depending on the brightness and the color of light, and therefore, the present embodiment is configured to achieve the optimal color balance, in consideration of the visual perception of the human eye, by changing the color balance in accordance with the brightness to attain a best spectral luminous efficiency of the human eyes.

Figure 26A:
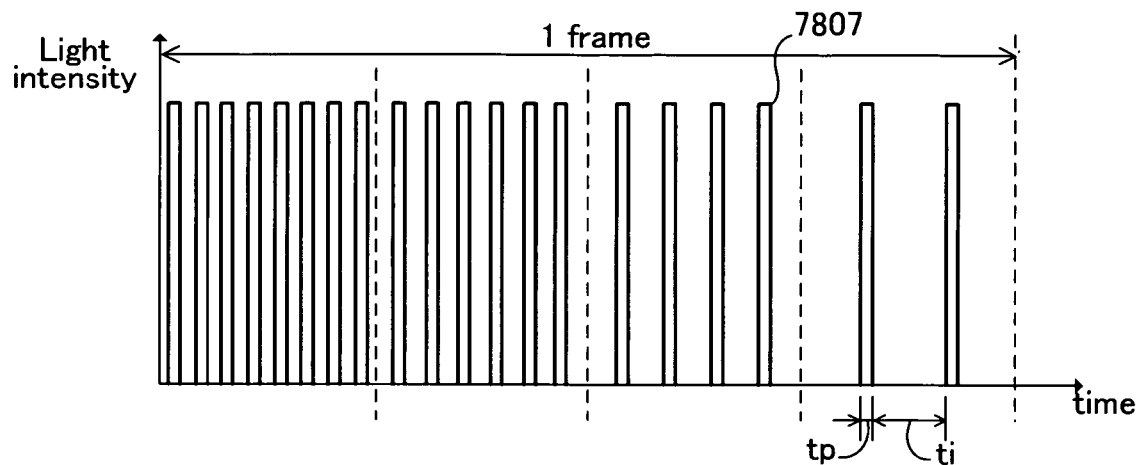
FIG. 26A is a chart exemplifying a gamma correction for increasing a correction effect on a lower brightness side by means of intermittent pulse emission in a projection apparatus according to the embodiment of the present invention.
Figure 26B:
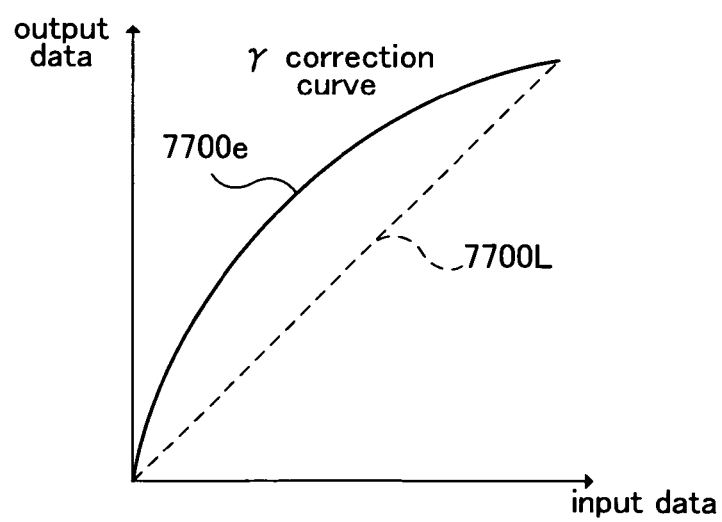
FIG. 26B is a chart exemplifying a gamma correction curve for performing a gamma correction for increasing a correction effect on a lower brightness side by means of a light source pattern shown in FIG. 26A.

FIGS. 26A and 26B illustrate a gamma correction curve 7700e performing a gamma correction to more effectively correct the lower brightness side by means of a light source pulse pattern 7807.

The light source pulse pattern 7807 shown in FIG. 26A controls the emission pattern of the adjustable light source 5210 to generate a plurality of emission pulses. These pulses have a constant emission pulse width tp with a small emission pulse interval on the start side (i.e., the lower density side) of the display period and gradually decrease in the number of pulses (specifically, the emission pulse interval ti gradually increases) towards the end of the display period. This control process makes it possible to attain a gamma correction curve 7700e which is convex-shaped toward the top-left of the conversion line 7700L and which, accordingly, provides a effective correction, i.e., increasing brightness, on the lower brightness side, as illustrated in FIG. 26B.

Figure 27A:
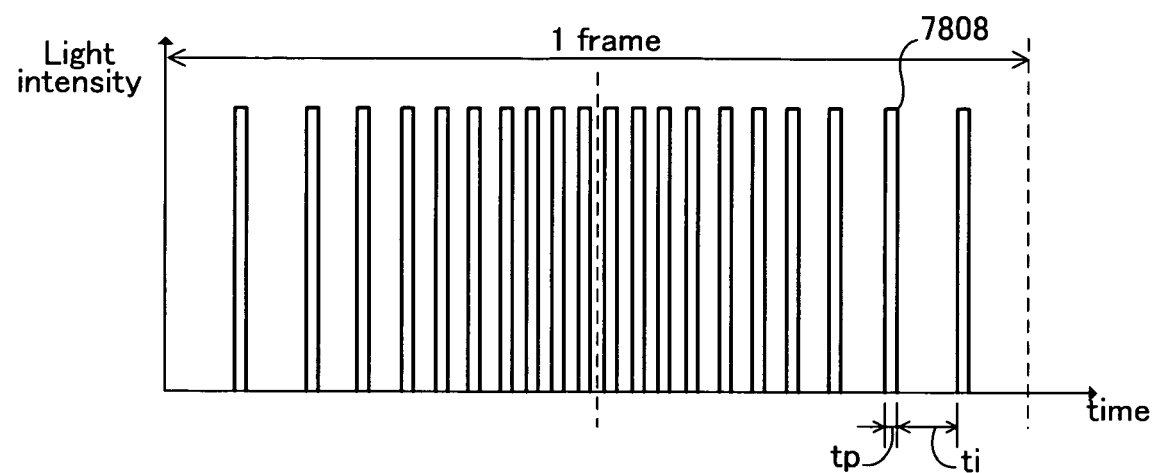
FIG. 27A is a chart exemplifying a gamma correction with consideration for human vision by means of intermittent pulse emission in a projection apparatus according to the embodiment of the present invention.
Figure 27B:
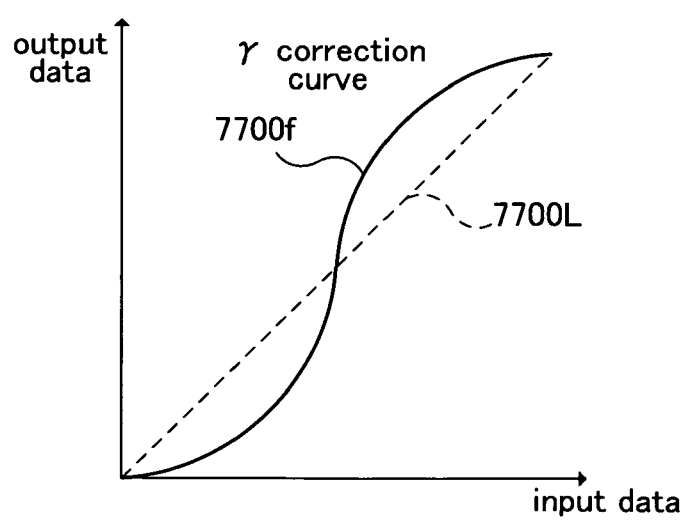
FIG. 27B is a chart exemplifying a gamma correction curve for performing a gamma correction with consideration for human vision by means of the light source pulse pattern shown in FIG. 27A.

FIGS. 27A and 27B illustrate a gamma correction with consideration given to human vision. This is done by a control of the adjustable light source 5210 with a light source pulse pattern 7808.

The human eye is highly sensitive to light in the mid-range of low and high brightness. Accordingly, the gamma correction is performed by controlling the adjustable light source 5210 with the light source pulse pattern 7808 which 1.) Causes emission pulses to have the same emission pulse width tp with a small emission pulse interval ti at the center of the display period of one frame and 2.) Gradually decreases the density of the emission pulse toward either side, as shown in FIG. 27A.

This control achieves a gamma correction using a gamma correction curve 7700f that is smaller than the conversion line 7700L on the lower brightness side and larger than that on the higher brightness side, thereby making it possible to obtain a modulated and clear projection image, i.e., darker on low brightness side and brighter on high brightness side.

Note that the present patent application has disclosed specific preferred embodiments of the present invention. However, various modifications and changes may be applied to these embodiments within the scope and/or concept of the present invention. Therefore, the present patent application and figures shall be construed as specific embodiment instead of being limited to these particular descriptions.

The present invention provides a technique to achieve an accurate modulation light intensity without being influenced by the transition between the ON state and OFF state in the ON/OFF modulation of a mirror.

The present invention also provides a technique to achieve control of a modulation light intensity independent of the speed of the tilt control of a mirror.

The present invention further provides a technique of controlling a color temperature and a color balance without requiring a change in the inputted video image signal.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

What is claimed is:

1. A display apparatus comprising:
   a light source;
   at least one spatial light modulator for modulating a luminous flux emitted from the light source; and
   a controller for processing inputted video image data for controlling the light source and the spatial light modulator, wherein the controller controls the light source and the spatial light modulator to project pulsed emission from the light source with a pulse width shorter than a period of a shortest controllable period of an ON state of the spatial light modulator;
   the period of the shortest controllable period of an ON state of the spatial light modulator is a minimum length of time controllable by the controller based on the video image data; and
   the minimum length of time controllable by the controller is a minimum period of time based on a minimum unit of data of the video image for controlling a brightness scale of the spatial light modulator.

2. The display apparatus according to claim 1, wherein:
   the light source comprises a light emitting diode (LED) or laser light source.

3. The display apparatus according to claim 1, wherein:
   the spatial light modulator is controlled to operate in a plurality of modulation states in accordance with a control signal received from the controller.

4. The display apparatus according to claim 1, further comprising:
   a projector, wherein
   the spatial light modulator further includes a mirror device comprising a plurality of micromirrors, and the projector projects a modulation light reflected and modulated by the mirror device.

5. The display apparatus according to claim 4 wherein:
the spatial light modulator is controlled by a control signal received from the controller to operate in an ON state for guiding the luminous flux emitted from the light source to the projector, or an OFF state for guiding the luminous flux emitted from the light source away from the projector or an oscillation state between the ON state and OFF state.

6. The display apparatus according to claim 5, wherein:
the cycle of the pulse emission is approximately the same as the oscillation cycle of the micromirror in the oscillation state.

7. The display apparatus according to claim 5, wherein:
the pulse width of the pulsed emissions is approximately the same as n times an oscillation cycle of the micromirror in the oscillation state, where "n" is a positive integer.

8. The display apparatus according to claim 1, wherein:
the light source stops the pulsed emission when a plurality of pixels of the spatial light modulator is in an OFF state.

9. The display apparatus according to claim 1, wherein:
the light source emitting a plurality of pulsed emissions during a period when the spatial light modulator is controlled under a modulation state.

10. The display apparatus according to claim 1, wherein:
the controller converts an inputted binary video signal into a non-binary video signal, and
the spatial light modulator applies the non-binary signal for controlling a modulation operation of the spatial light modulator.

11. A display apparatus comprising;
a light source;
at least one spatial light modulator for modulating a luminous flux emitted from the light source;
a controller for processing inputted video image data for controlling the light source and the spatial light modulator, wherein the controller controls the light source and the spatial light modulator to project pulsed emission from the light source with a pulse width shorter than a period of a shortest controllable period of an ON state of the spatial light modulator; and
the controller controls the pulse widths of a plurality of pulsed emissions emitted from the light source when the spatial light modulator is operated in an ON state for changing a light intensity of a display image.

12. A display apparatus comprising:
a light source;
at least one spatial light modulator for modulating a luminous flux emitted from the light source;
a controller for processing inputted video image data for controlling the light source and the spatial light modulator, wherein the controller controls the light source and the spatial light modulator to project pulsed emission from the light source with a pulse width shorter than a period of a shortest controllable period of an ON state of the spatial light modulator; and
the controller controls a plurality of the pulsed emissions for emitting different pulse intensities from the light source when the spatial light modulator is operated in an ON state for changing a light intensity of a display image.

13. A display apparatus comprising:
a light source;
at least one spatial light modulator for modulating a luminous flux emitted from the light source;
a controller for processing inputted video image data for controlling the light source and the spatial light modulator, wherein the controller controls the light source and the spatial light modulator to project pulsed emission from the light source with a pulse width shorter than a period of a shortest controllable period of an ON state of the spatial light modulator; and
the controller controls a number of cycles for emitting said plurality of the pulsed emissions from the light source when the spatial light modulator is operated in an ON state for changing a light intensity of a display image.

14. A display apparatus comprising:
a light source;
at least one spatial light modulator for modulating a luminous flux emitted from the light source;
a controller for processing inputted video image data for controlling the light source and the spatial light modulator, wherein the controller controls the light source and the spatial light modulator to project pulsed emission from the light source with a pulse width shorter than a period of a shortest controllable period of an ON state of the spatial light modulator; and
the controller controls said plurality of the pulsed emissions with different pulse width from the light source during a frame period of a video image or during a sub-frame of said video image when the spatial light modulator is operated in an ON state for changing a light intensity of a display image.

15. A display apparatus comprising:
a light source;
at least one spatial light modulator for modulating a luminous flux emitted from the light source;
a controller for processing inputted video image data for controlling the light source and the spatial light modulator, wherein the controller controls the light source and the spatial light modulator to project pulsed emission from the light source with a pulse width shorter than a period of a shortest controllable period of an ON state of the spatial light modulator; and
the controller controls said plurality of the pulsed emissions with different intensities from the light source during a frame period of a video image or during a sub-frame of said video image when the spatial light modulator is operated in a an ON state for changing a light intensity of a display image.

16. A display apparatus comprising:
a light source;
at least one spatial light modulator for modulating a luminous flux emitted from the light source;
a controller for processing inputted video image data for controlling the light source and the spatial light modulator, wherein the controller controls the light source and the spatial light modulator to project pulsed emission from the light source with a pulse width shorter than a period of a modulation state of the spatial light modulator; and
the controller controls a number of cycles for emitting said plurality of the pulsed emissions from the light source during a frame period of a video image or during a sub-frame of said video image when the spatial light modulator is operated in the modulation state for changing a light intensity of a display image.

17. A display apparatus comprising:
a light source;
at least one spatial light modulator for modulating a luminous flux emitted from the light source;

a controller for processing inputted video image data for controlling the light source and the spatial light modulator, wherein the controller controls the light source and the spatial light modulator to project pulsed emission from the light source with a pulse width shorter than a period of a shortest controllable period of an ON state of the spatial light modulator; and the controller controls said light source to project said pulsed emission during at least a part of a transition time between an ON state and an OFF state controlled by said spatial light modulator.

18. A display apparatus comprising:

a light source or light sources for emitting a luminous flux or luminous fluxes having a plurality of colors;

spatial light modulators for modulating the luminous flux(es) having a plurality of colors emitted from the light source(s);

a controller for processing an inputted video image data and for controlling the light source(s) and spatial light modulators, wherein the controller applies the input video image data to generate video signals of a plurality of colors, and the controller further controls the light sources of at least two colors to emit color sequential pulsed emissions during a period shorter than a period of a shortest controllable period of an ON state of the spatial light modulators; and the controller controls the light source(s) to perform pulse emission in a sequential emission of all colors from the light source(s) containing a plurality of colors for a period shorter than the shortest controllable period of the ON state of the spatial light modulator.

19. The display apparatus according to claim 18, wherein:

the period of a modulation state of the spatial light modulator is a minimum length of time controllable by the controller based on the video image data.

20. The display apparatus according to claim 18, wherein:

the light source comprising a light emitting diode (LED) or laser light source.

21. The display apparatus according to claim 18, wherein:

the spatial light modulator is controlled to operate in a plurality of modulation states in accordance with a control signal received from the controller.

22. The display apparatus according to claim 18, wherein:

a projector, wherein the spatial light modulator further includes a mirror device comprising a plurality of micromirrors, and the projector projects a modulation light reflected and modulated by the mirror device.

23. The display apparatus according to claim 22, wherein:

the spatial light modulator is controlled by a control signal received from the controller to operate in an ON state for guiding the luminous flux emitted from the light source to the projector, or an OFF state for guiding the luminous flux emitted from the light source away from the projector or an oscillation state between the ON state and OFF state.

24. The display apparatus according to claim 22, wherein:

the controller controls the light source to emit the pulse emissions with respective cycles of the pulse emission of at least one of the two colors are approximately the same as the oscillation cycle of the micromirror in an oscillation state.

25. The display apparatus according to claim 22, wherein:

the controller controls the light source to emit the pulse emissions with respective cycles of the pulse emission of at least one of the at least two colors are approximately the same as a value obtained by n times the oscillation cycle of the micromirror in the oscillation state, where "n" is a positive integer.

26. The display apparatus according to claim 18, wherein:

the controller controls the light source to emit the pulse emissions with a pulse width of each single pulse emission in the color sequential emission emitted from the light source(s) having at least two colors is a predetermined value.

27. The display apparatus according to claim 18, wherein:

the controller controls the light source to emit the pulse emissions with pulse widths of each single of pulse emission in the color sequential emission emitted from the light source having at least two colors.

28. The display apparatus according to claim 18, wherein:

the controller controls the light source to adjust and change cycles of the pulse emissions in the color sequential emission emitted from the light source of at least two colors.

29. A display apparatus comprising:

a light source or light sources for emitting a luminous flux or luminous fluxes having a plurality of colors;

spatial light modulators for modulating the luminous flux(es) having a plurality of colors emitted from the light source(s);

a controller for processing an inputted video image data and for controlling the light source(s) and spatial light modulators, wherein the controller applies the input video image data to generate video signals of a plurality of colors, and the controller further controls the light sources of at least two colors to emit color sequential pulsed emissions during a period shorter than a a shortest controllable period of an ON state of the spatial light modulators; and the shortest controllable period of an ON state controllable by the controller is a minimum period of time based on a minimum unit of data of the video image for controlling a brightness scale of the spatial light modulator.

30. A display apparatus comprising:

a light source or light sources for emitting a luminous flux or luminous fluxes having a plurality of colors;

spatial light modulators for modulating the luminous flux(es) having a plurality of colors emitted from the light source(s);

a controller for processing an inputted video image data and for controlling the light source(s) and spatial light modulators, wherein the controller applies the input video image data to generate video signals of a plurality of colors, and the controller further controls the light sources of at least two colors to emit color sequential pulsed emissions during a period shorter than a period of a shortest controllable period of an ON state of the spatial light modulators; and the controller controls the light source to emit the pulse emissions with a pulse width of each single pulse emission in a color sequential emission emitted from the light source(s) having at least two colors having a certain ratio in a period of the ON state of the spatial light modulator.

31. A display apparatus comprising:

a light source or light sources for emitting a luminous flux or luminous fluxes having a plurality of colors;

spatial light modulators for modulating the luminous flux(es) having a plurality of colors emitted from the light source(s);

a controller for processing an inputted video image data and for controlling the light source(s) and spatial light modulators, wherein the controller applies the input video image data to generate video signals of a plurality of colors, and the controller further controls the light sources of at least two colors to emit color sequential pulsed emissions during a period shorter than a period of a shortest controllable period of an ON state of the spatial light modulators; and the controller controls the light source to change the pulse widths of each single pulse emission in a color sequential emission emitted from the light sources(s) of at least two colors for adjusting a color balance of a display image.

32. A display apparatus comprising:

a light source or light sources for emitting a luminous flux or luminous fluxes having a plurality of colors;

spatial light modulators for modulating the luminous flux(es) having a plurality of colors emitted from the light source(s);

a controller for processing an inputted video image data and for controlling the light source(s) and spatial light modulators, wherein the controller applies the input video image data to generate video signals of a plurality of colors, and the controller further controls the light sources of at least two colors to emit color sequential pulsed emissions during a period shorter than a period of a modulation state of the spatial light modulators; and the controller controls the light source to change cycles of each single pulse emission in a color sequential emission emitted from the light source(s) of at least two colors for adjusting and changing a color balance of a display image.

33. A display apparatus comprising:

a light source or light sources for emitting a luminous flux or luminous fluxes having a plurality of colors;

spatial light modulators for modulating the luminous flux(es) having a plurality of colors emitted from the light source(s);

a controller for processing an inputted video image data and for controlling the light source(s) and spatial light modulators, wherein the controller applies the input video image data to generate video signals of a plurality of colors, and the controller further controls the light sources of at least two colors to emit color sequential pulsed emissions during a period shorter than a period of a modulation state of the spatial light modulators; and the controller controls the light source to change the respective cycles of the pulse emission of at least two colors to increase a brightness of a displayed video image for increasing a component of a combined color within a displayed image.

34. A display apparatus comprising:

a light source or light sources for emitting a luminous flux or luminous fluxes having a plurality of colors;

spatial light modulators for modulating the luminous flux(es) having a plurality of colors emitted from the light source(s);

a controller for processing an inputted video image data and for controlling the light source(s) and spatial light modulators, wherein the controller applies the input video image data to generate video signals of a plurality of colors, and the controller further controls the light sources of at least two colors to emit color sequential pulsed emissions during a period shorter than a period of a modulation state of the spatial light modulators; and the light sources further emitting sequential emissions of at least three colors and said light source further controlling and adjusting the pulse width of the pulse emissions of the respective colors for increasing the white component within a displayed image, thereby increasing the brightness thereof.

* * * * *